US008717484B2

(12) United States Patent
McMackin et al.

(10) Patent No.: US 8,717,484 B2
(45) Date of Patent: May 6, 2014

(54) TIR PRISM TO SEPARATE INCIDENT LIGHT AND MODULATED LIGHT IN COMPRESSIVE IMAGING DEVICE

(75) Inventors: Lenore McMackin, Austin, TX (US); Sujoy Chatterjee, Austin, TX (US)

(73) Assignee: InView Technology Corporation, Austin, TX (US)

( * ) Notice: Subject to any disclaimer, the term of this patent is extended or adjusted under 35 U.S.C. 154(b) by 426 days.

(21) Appl. No.: 13/207,900

(22) Filed: Aug. 11, 2011

(65) Prior Publication Data

US 2012/0038819 A1 Feb. 16, 2012

Related U.S. Application Data

(63) Continuation-in-part of application No. 13/193,553, filed on Jul. 28, 2011, now Pat. No. 8,570,405, and a continuation-in-part of application No. 13/193,556, filed on Jul. 28, 2011, now Pat. No. 8,570,406.

(60) Provisional application No. 61/372,826, filed on Aug. 11, 2010.

(51) Int. Cl.
*H04N 9/07* (2006.01)
(52) U.S. Cl.
USPC .......................................................... 348/337
(58) Field of Classification Search
USPC .......................................................... 348/337
See application file for complete search history.

(56) References Cited

U.S. PATENT DOCUMENTS

| 6,839,166 B2* | 1/2005 | Fukushima et al. .......... 359/368 |
| 8,199,244 B2 | 6/2012 | Baraniuk et al. |
| 2006/0239336 A1 | 10/2006 | Baraniuk et al. |
| 2009/0190101 A1 | 7/2009 | Alasaarela et al. |
| 2009/0201236 A1* | 8/2009 | Arai et al. ........................ 345/84 |
| 2010/0189344 A1 | 7/2010 | Maes |
| 2012/0038786 A1 | 2/2012 | Kelly et al. |
| 2012/0038789 A1 | 2/2012 | Kelly et al. |
| 2012/0038790 A1 | 2/2012 | Kelly et al. |
| 2012/0038798 A1 | 2/2012 | Woods et al. |
| 2012/0038805 A1 | 2/2012 | Kelly et al. |
| 2012/0038817 A1 | 2/2012 | McMackin et al. |

OTHER PUBLICATIONS

Maes, Dirk; "Dual TIR prism, a way to boost the performance of a DLP projector," Barco, SID MEC Spring Meeting, Mar. 13, 2008; pp. 1-13.

(Continued)

*Primary Examiner* — Albert Cutler
(74) *Attorney, Agent, or Firm* — Meyertons Hood Kivlin Kowert & Goetzel, P.C.; Jeffrey C. Hood; Mark K. Brightwell

(57) ABSTRACT

A compressive imaging system including a light modulator, a light sensing device and a TIR prism. The TIR prism is configured to receive an incident light beam, to provide the incident light beam to the light modulator, to receive a modulated light beam MLB from the light modulator, and to direct the modulated light beam onto a sensing path. The light sensing device receives the modulated light beam (or at least a portion of the modulated light beam) and generates an electrical signal that represents intensity of the modulated light beam (or the "at least a portion" of the modulated light beam). The TIR prism may reduce a distance required to separate the incident light beam from the modulated light beam.

22 Claims, 24 Drawing Sheets

(56) References Cited

OTHER PUBLICATIONS

Takhar et al.; "A New Compressive Imaging Camera Architecture using Optical-Domain Compression;" Society of Photo-Optical Instrumentation Engineers, Jan. 2006, retrieved from <http://dsp.rice.edu/sites/dsp.rice.edu/files/cs/cscam-SPIEJan06.pdf> on Dec. 18, 2012; pp. 1-10.

U.S. Appl. No. 61/502,153, entitled "Various Compressive Sensing Mechanisms;" filed Jun. 28, 2011, invented by James M. Tidman et al.

* cited by examiner

1900

```
receive an incident light beam L at a first surface of a TIR prism pair  1910
```
↓
```
totally internally reflect the incident light beam at a second surface of the TIR
prism pair prior to outputting the incident light beam at a third surface of the
TIR prism pair, where the incident light beam is outputted to an array of
mirrors, where each of the mirrors is configured to controllably switch
between two orientation states  1915
```
↓
```
receive a modulated light beam at the third surface of the TIR prism pair,
where the modulated light beam is received from the array of mirrors  1920
```
↓
```
output the modulated light beam at an exiting surface, where the modulated
light beam is outputted onto a sensing path  1925
```
↓
```
generate an electrical signal representing intensity of at least a portion of the
modulated light beam as a function of time  1930
```

Fig. 19

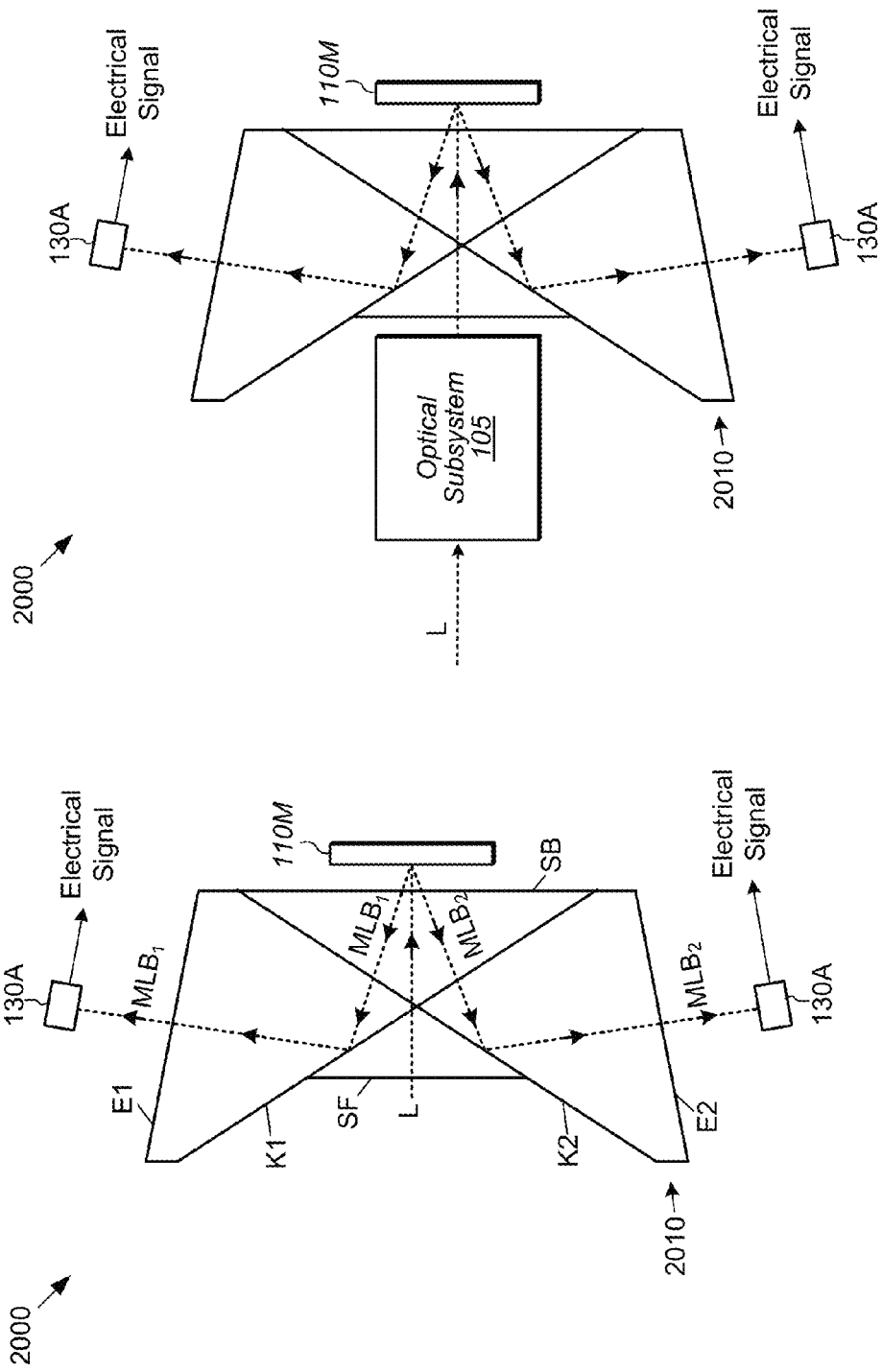

2200

```
receive an incident light beam at a front surface of a dual TIR prism  2210
```
↓
```
output the incident light beam at a back surface of the dual TIR prism  2215
```
↓
```
receive a first modulated light beam and a second modulated light beam at the back
surface of the dual TIR prism, where the first modulated light beam and the second
modulated light beam have different angles of incidence upon the back surface,
where the first modulated light beam and the second modulated light beam are
produced by an array of mirrors, where each of the mirrors is configured to
controllably switch between two orientation states   2220
```
↓
```
totally internally reflect the first modulated light beam at a first partially-internal
surface of the dual TIR prism  2225
```
↓
```
after said totally internally reflecting the first modulated light beam, output the first
modulated light beam onto a first light sensing path  2230
```
↓
```
totally internally reflect the second modulated light beam at a second partially-
internal surface of the dual TIR prism  2235
```
↓
```
after totally internally reflecting the second modulated light beam, output the second
modulated light beam onto a second light sensing path  2240
```

Fig. 22

TIR PRISM TO SEPARATE INCIDENT LIGHT AND MODULATED LIGHT IN COMPRESSIVE IMAGING DEVICE

RELATED APPLICATION DATA

This application claims the benefit of priority to U.S. Provisional Application No. 61/372,826, filed on Aug. 11, 2010, entitled "Compressive Sensing Systems and Methods", invented by Richard Baraniuk, Gary Woods, Kevin Kelly, Robert Bridge, Sujoy Chatterjee and Lenore McMackin, which is hereby incorporated by reference in its entirety as though fully and completely set forth herein.

This application is a continuation in part of U.S. application Ser. No. 13/193,553, filed on Jul. 28, 2011 now U.S. Pat. No. 8,570,405, invented by Richard Baraniuk, Kevin Kelly, Robert Bridge, Sujoy Chatterjee and Lenore McMackin, titled "Determining Light Level Variation in Compressive Imaging by Injecting Calibration Patterns into Pattern Sequence", which is hereby incorporated by reference in its entirety as though fully and completely set forth herein.

This application is also a continuation in part of U.S. application Ser. No. 13/193,556, filed on Jul. 28, 2011 now U.S. Pat. No. 8,570,406, invented by Richard Baraniuk, Kevin Kelly, Robert Bridge, Sujoy Chatterjee and Lenore McMackin, titled "Low-Pass Filtering of Compressive Imaging Measurements to Infer Light Level Variation", which is hereby incorporated by reference in its entirety as though fully and completely set forth herein.

FIELD OF THE INVENTION

The present invention relates to the field of compressive sensing, and more particularly to systems and methods for that utilize total internal reflection (TIR) prisms to separate incident light from modulated light.

DESCRIPTION OF THE RELATED ART

According to Nyquist theory, a signal x(t) whose signal energy is supported on the frequency interval [−B,B] may be reconstructed from samples {x(nT)} of the signal x(t), provided the rate $f_S=1/T_S$ at which the samples are captured is sufficiently high, i.e., provided that $f_S$ is greater than 2B. Similarly, for a signal whose signal energy is supported on the frequency interval [A,B], the signal may be reconstructed from samples captured with sample rate greater than B−A. A fundamental problem with any attempt to capture a signal x(t) according to Nyquist theory is the large number of samples that are generated, especially when B (or B−A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image I(x,y) that depends on spatial variables x and y, the image may be reconstructed from samples of the image, provided the samples are captured with sufficiently high spatial density. For example, given samples {I(nΔx, mΔy)} captured along a rectangular grid, the horizontal and vertical densities 1/Δx and 1/Δy should be respectively greater than $2B_x$ and $2B_y$, where $B_x$ and $B_y$ are the highest x and y spatial frequencies occurring in the image I(x,y). The same problem of overwhelming data volume is experienced when attempting to capture an image according to Nyquist theory. The modern theory of compressive sensing is directed to such problems.

Compressive sensing relies on the observation that many signals (e.g., images or video sequences) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation T when the transformation of the signal vector, Tv, has no more than K non-zero coefficients. A signal vector v is said to be sparse with respect to a given transformation T when it is K-sparse with respect to that transformation for some integer K much smaller than the number L of components in the transformation vector Tv.

A signal vector v is said to be approximately K-sparse with respect to a given transformation T when the coefficients of the transformation vector, Tv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation T. A signal vector v is said to be approximately sparse with respect to a given transformation T when it is approximately K-sparse with respect to the transformation T for some integer K much less than the number L of components in the transformation vector Tv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts are the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors {R(i)} in the N-dimensional space, where M is larger than K but still much smaller than N. Each projection gives a corresponding real number s(i), e.g., according to the expression $$s(i) = <v, R(i)>,$$

where the notation $<v,R(i)>$ represents the inner product (or dot product) of the vector v and the vector R(i). Thus, the series of M projections gives a vector U including M real numbers. Compressive sensing theory further prescribes methods for reconstructing (or estimating) the vector v of N samples from the vector U of M real numbers. For example, according to one method, one should determine the vector x that has the smallest length (in the sense of the $L_1$ norm) subject to the condition that $\Phi Tx = U$, where $\Phi$ is a matrix whose rows are the transposes of the vectors R(i), where T is the transformation under which the image is K sparse or approximately K sparse.

Compressive sensing is important because, among other reasons, it allows reconstruction of an image based on M measurements instead of the much larger number of measurements N recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. patent application Ser. No. 11/379,688 (published as 2006/0239336 and invented by Baraniuk et al.) and illustrated in FIG. 1, an imaging device (e.g., camera) may be configured to take advantage of the compressive sensing paradigm by using a digital micromirror device (DMD) 40. An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from the micromirrors in the first orientation state onto a photodiode (or photodetector) situated at location 60. Thus, the photodiode generates a signal whose amplitude at any given time represents a sum of the intensities of the light portions from the micromirrors in the first orientation state.

The compressive sensing is implemented by driving the orientations of the micromirrors through a series of spatial patterns. Each spatial pattern specifies an orientation state for each of the micromirrors. The output signal of the photodiode is digitized by an A/D converter 70. In this fashion, the imaging device is able to capture a series of measurements $\{s(i)\}$ that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above.

The incident light field may be modeled by a function I(x,y,t) of two spatial variables and time. Assuming for the sake of discussion that the DMD comprises a rectangular array. The DMD implements a spatial modulation of the incident light field so that the light field leaving the DMD in the direction of the lens 50 might be modeled by $$\{I(n\Delta x, m\Delta y, t) * M(n,m,t)\}$$

where m and n are integer indices, where $I(n\Delta x, m\Delta y, t)$ represents the portion of the light field that is incident upon that $(n,m)^{th}$ mirror of the DMD at time t. The function M(n,m,t) represents the orientation of the $(n,m)^{th}$ mirror of the DMD at time t. At sampling times, the function M(n,m,t) equals one or zero, depending on the state of the digital control signal that controls the $(n,m)^{th}$ mirror. The condition M(n,m,t)=1 corresponds to the orientation state that reflects onto the path that leads to the lens 50. The condition M(n,m,t)=0 corresponds to the orientation state that reflects away from the lens 50.

The lens 50 concentrates the spatially-modulated light field $$\{I(n\Delta x, m\Delta y, t) * M(n,m,t)\}$$

onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t) M(n, m, t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the mirrors. The multiplication portion of the inner product is implemented by the mirrors of the DMD. The summation portion of the inner product is implemented by the concentrating action of the lens and also the integrating action of the photodiode.

In a compressive sensing device such as that described above, an incident light beam L is modulated by the DMD 40 to form a modulated light beam as shown in FIG. 1B. Before the modulated light beam can be sensed (measured) it should travel far enough away from the DMD to cleanly separate from the incident light beam. In FIG. 1B, the point P represents the point of final intersection between the two beams. Because the modulated light beam departs from the DMD at an angle θ (which is limited by the range of angular movement of the DMD micromirrors), the distance of the point P from the DMD may be approximated by x=d*cot(θ), where d is the diameter of the incident light beam. The lens 20 can be no closer to the DMD than x. This distance requirement imposes a constraint on the overall size of the compressive sensing device. If the incident light beam and the modulated light beam could be separated from one another over a smaller distance, then the overall size of the system could be reduced.

SUMMARY

In one embodiment, an imaging system may include a light modulation unit, a TIR prism pair and a light sensing device.

The light modulation unit includes an array of mirrors.

The TIR prism pair is configured to receive an incident light beam, to provide the incident light beam to the light modulation unit, to receive a modulated light beam from the light modulation unit, and to direct the modulated light beam MLB onto a sensing path.

The light sensing device is configured to receive at least a portion of the modulated light beam from the sensing path. The light sensing device is configured to generate an electrical signal representing intensity of the "at least a portion" of the modulated light beam as a function of time.

In another embodiment, a system may include a light modulation unit, a TIR prism pair and a light sensing device.

The light modulation unit includes an array of mirrors, where each of the mirrors is configured to controllably switch between two orientation states. By saying that each of the mirrors is configured to controllably switch between two orientation states, we do not mean to exclude the possibility that each mirror may have more than two orientation states. Indeed, in some embodiments, each mirror may have three or more states, or even, a continuous range of orientation states.

The TIR prism pair is configured to receive an incident light beam and output the incident light beam to the array of mirrors. The TIR prism pair is further configured to receive a modulated light beam from the array of mirrors, totally internally reflect the modulated light beam, and output the modulated light beam onto a sensing path. The array of mirrors is configured to produce the modulated light beam by modulating the incident light beam as received from the TIR prism pair.

The light sensing device is configured to receive at least a portion of the modulated light beam from the sensing path. Furthermore, the light sensing device is configured to generate an electrical signal representing intensity of the "at least a portion" of the modulated light beam as a function of time.

In yet another embodiment, a system may include a light modulation unit, a TIR prism pair and a light sensing device.

The light modulation unit includes an array of mirrors, where each of the mirrors is configured to controllably switch between two orientation states.

The TIR prism pair is configured to receive an incident light beam and to totally internally reflect the incident light beam prior to outputting the incident light beam to the array of mirrors. The TIR prism pair is further configured to receive a modulated light beam from the array of mirrors and output the modulated light beam onto a sensing path, where the array of mirrors is configured to produce the modulated light beam by modulating the incident light beam as received from the TIR prism pair.

The light sensing device is configured to receive at least a portion of the modulated light beam from the sensing path, where the light sensing device is configured to generate an electrical signal representing intensity of the "at least a portion" of the modulated light beam as a function of time.

In yet another embodiment, a system may include a light modulation unit, a dual TIR prism, a first light sensing device and a second light sensing device.

The light modulation unit includes an array of mirrors, where each of the mirrors is configured to controllably switch between two orientation states.

The dual TIR prism has a front surface, a back surface, a first partially-internal surface, a second partially-internal surface, a first exiting surface and a second exiting surface. The dual TIR prism is configured to receive an incident light beam at the front surface and output the incident light beam at the back surface. The dual TIR prism is further configured to receive a first modulated light beam from the array of mirrors at the back surface, totally internally reflect the first modulated light beam at the first partially-internal surface, and output the first modulated light beam onto a first sensing path at the first exiting surface. The dual TIR prism is yet further configured to receive a second modulated light beam from the array of mirrors at the back surface, totally internally reflect the second modulated light beam at the second partially-internal surface, and output the second modulated light beam onto a second sensing path at the second exiting surface. The first modulated light beam comprises pieces of the incident light beam that are reflected by mirrors in a first of the two orientation states. The second modulated light beam comprises pieces of the incident light beam that are reflected by mirrors in a second of the two orientation states.

The first light sensing device is configured to receive at least a portion of the first modulated light beam from the first sensing path, and generate a first electrical signal representing intensity of the "at least a portion" of the first modulated light beam; and The second light sensing device is configured to receive at least a portion of the second modulated light beam from the second sensing path, and generate a second electrical signal representing intensity of the "at least a portion" of the second modulated light beam.

Various additional embodiments are described in U.S. Provisional Application No. 61/372,826, which is hereby incorporated by reference in its entirety as though fully and completely set forth herein.

BRIEF DESCRIPTION OF THE DRAWINGS

A better understanding of the present invention can be obtained when the following detailed description of the preferred embodiments is considered in conjunction with the following drawings.

FIG. 19 illustrates one embodiment of a method for separating incident light and modulated light using a TIR prism pair (e.g., TIR prism pair 1710).

FIG. 20 illustrates one embodiment of a system 2000 for separating an incident light beam from the two modulated light beams generated by the light modulation unit 110M, using a dual TIR prism.

FIG. 21 illustrates one embodiment of system 2000 that includes the optical subsystem 105.

FIG. 22 illustrates one embodiment of a method for separating incident light and modulated light using a dual TIR prism pair (e.g., the dual TIR prism pair 2010).

Figure 1A:
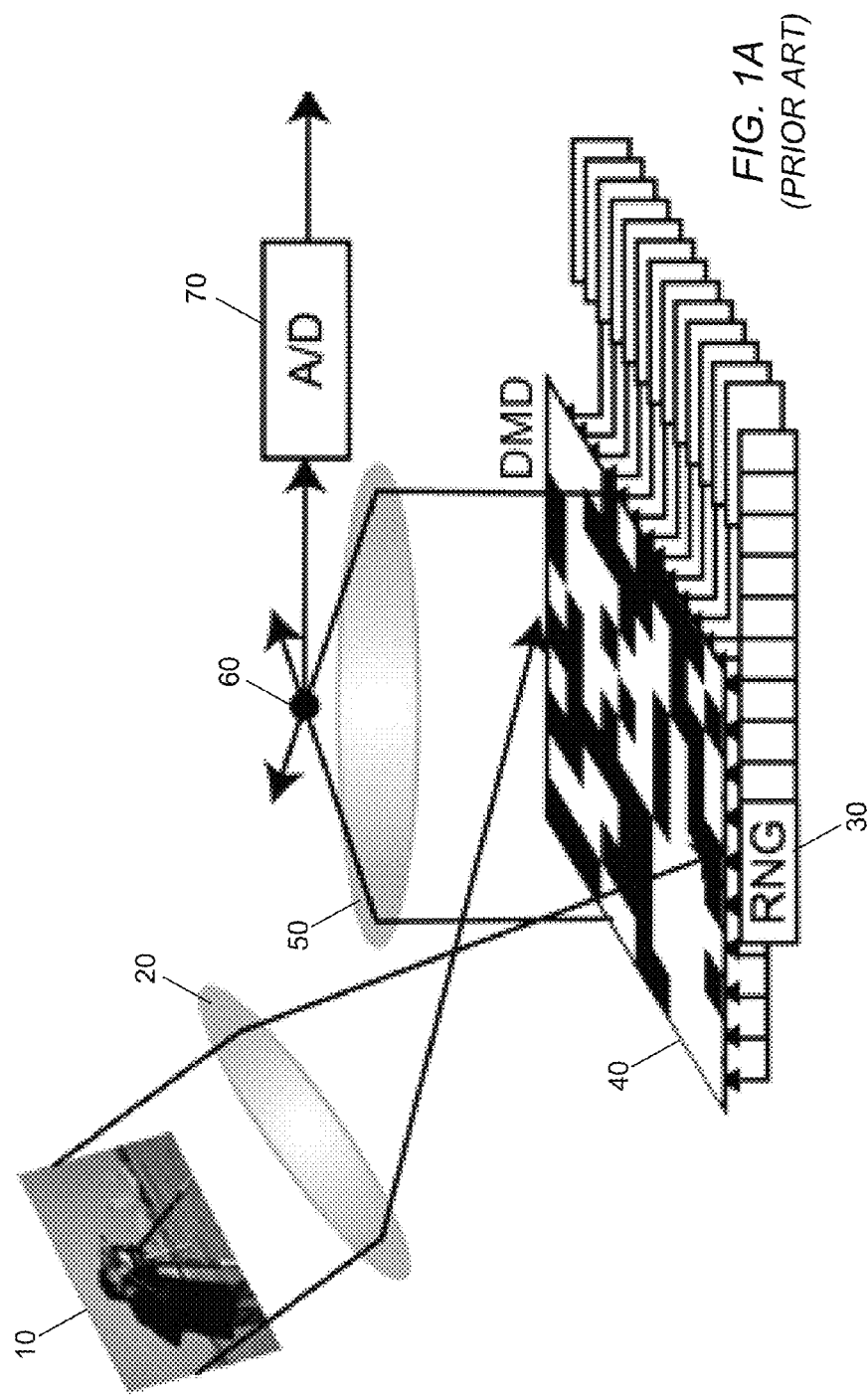
FIG. 1A illustrates a compressive sensing camera according to the prior art.
Figure 1B:
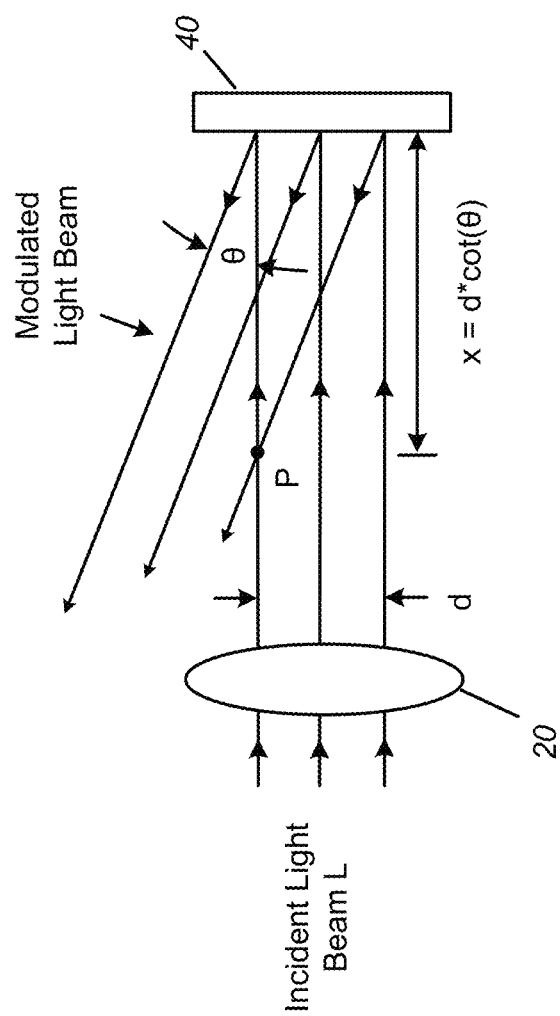
FIG. 1B illustrates a distance requirement for separation of an incident light beam and a modulated light beam from a digital micromirror device (DMD).

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The following patent applications provide teachings regarding compressive sensing and compressive imaging:

U.S. Provisional Application No. 60/673,364 entitled "Method and Apparatus for Optical Image Compression," filed on Apr. 21, 2005;

U.S. Provisional Application No. 60/679,237 entitled "Method and Apparatus for Reconstructing Data from Multiple Sources," filed on May 10, 2005;

U.S. Provisional Application No. 60/729,983 entitled "Random Filters for Compressive Sampling and Reconstruction," filed on Oct. 25, 2005;

U.S. Provisional Application No. 60/732,374 entitled "Method and Apparatus for Compressive Sensing for Analog-to-Information Conversion," filed on Nov. 1, 2005;

U.S. Provisional Application No. 60/735,616 entitled "Method and Apparatus for Distributed Compressed Sensing," filed on Nov. 10, 2005;

U.S. Provisional Application No. 60/759,394 entitled "Sudocodes: Efficient Compressive Sampling Algorithms for Sparse Signals," filed on Jan. 16, 2006;

U.S. patent application Ser. No. 11/379,688 entitled "Method and Apparatus for Compressive Imaging Device", filed on Apr. 21, 2006; and U.S. patent application Ser. No. 12/791,171 entitled "Method and Apparatus for Compressive Imaging Device", filed on Jun. 1, 2010.

TERMINOLOGY

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. A memory medium is typically computer-readable, e.g., is capable of being read by a computer.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), computer-based television systems, grid computing systems, wearable computers, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

System 100 for Operating on Light

Figure 2A:
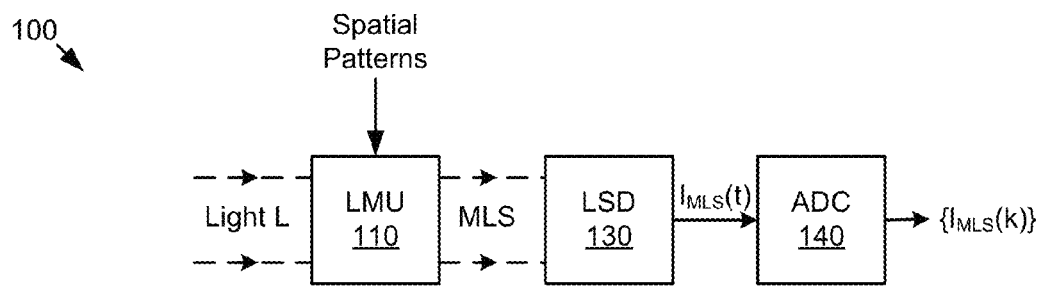
FIG. 2A illustrates one embodiment of a system 100 that is operable to capture compressive imaging samples and also samples of background light level. (LMU is an acronym for "light modulation unit". MLS is an acronym for "modulated light stream". LSD is an acronym for "light sensing device".)

A system 100 for operating on light may be configured as shown in FIG. 2A. The system 100 may include a light modulation unit 110, a light sensing device 130 and an analog-to-digital converter (ADC) 140.

The light modulation unit 110 is configured to modulate a received stream of light L with a series of spatial patterns in order to produce a modulated light stream (MLS). The spatial patterns of the series may be applied sequentially to the light stream so that successive time slices of the light stream are modulated, respectively, with successive ones of the spatial patterns. (The action of sequentially modulating the light stream L with the spatial patterns imposes the structure of time slices on the light stream.) The light modulation unit 110 includes a plurality of light modulating elements configured to modulate corresponding portions of the light stream. Each of the spatial patterns specifies an amount (or extent or value) of modulation for each of the light modulating elements. Mathematically, one might think of the light modulation unit's action of applying a given spatial pattern as performing an element-wise multiplication of a light field vector $(x_{ij})$ representing a time slice of the light stream L by a vector of scalar modulation values $(m_{ij})$ to obtain a time slice of the modulated light stream: $(m_{ij})*(x_{ij})=(m_{ij}*x_{ij})$. The vector $(m_{ij})$ is specified by the spatial pattern. Each light modulating element effectively scales (multiplies) the intensity of its corresponding stream portion by the corresponding scalar factor.

The light modulation unit 110 may be realized in various ways. In some embodiments, the LMU 110 may be realized by a plurality of mirrors (e.g., micromirrors) whose orientations are independently controllable. In another set of embodiments, the LMU 110 may be realized by an array of elements whose transmittances are independently controllable, e.g., as with an array of LCD shutters. An electrical control signal supplied to each element controls the extent to which light is able to transmit through the element. In yet another set of embodiments, the LMU 110 may be realized by an array of independently-controllable mechanical shutters (e.g., micromechanical shutters) that cover an array of apertures, with the shutters opening and closing in response to electrical control signals, thereby controlling the flow of light through the corresponding apertures. In yet another set of embodiments, the LMU 110 may be realized by a perforated mechanical plate, with the entire plate moving in response to electrical control signals, thereby controlling the flow of light through the corresponding perforations. In yet another set of embodiments, the LMU 110 may be realized by an array of transceiver elements, where each element receives and then retransmits light in a controllable fashion. In yet another set of embodiments, the LMU 110 may be realized by a grating light valve (GLV) device. In yet another embodiment, the LMU 110 may be realized by a liquid-crystal-on-silicon (LCOS) device.

In some embodiments, the light modulating elements are arranged in an array, e.g., a two-dimensional array or a one-dimensional array. Any of various array geometries are contemplated. For example, in some embodiments, the array is a square array or rectangular array. In another embodiment, the array is hexagonal. In some embodiments, the light modulating elements are arranged in a spatially random fashion.

Let N denote the number of light modulating elements in the light modulation unit 110. In various embodiments, the number N may take a wide variety of values. For example, in different sets of embodiments, N may be, respectively, in the range [64, 256], in the range [256, 1024], in the range [1024, 4096], in the range $[2^{12},2^{14}]$, in the range $[2^{14},2^{16}]$, in the range $[2^{16},2^{18}]$, in the range $[2^{18},2^{20}]$, in the range $[2^{20},2^{22}]$, in the range $[2^{22},2^{24}]$, in the range $[2^{24},2^{26}]$, in the range from $2^{26}$ to infinity. The particular value used in any given embodiment may depend on one or more factors specific to the embodiment.

The light sensing device 130 is configured to receive the modulated light stream MLS and to generate an analog electrical signal $I_{MLS}(t)$ representing intensity of the modulated light stream as a function of time.

The light sensing device 130 may include one or more light sensing elements. The term "light sensing element" may be interpreted as meaning "a transducer between a light signal and an electrical signal". For example, a photodiode is a light sensing element. In various other embodiments, light sensing elements might include devices such as metal-semiconductor-metal (MSM) photodetectors, phototransistors, phototubes and photomultiplier tubes.

In some embodiments, the light sensing device 130 includes one or more amplifiers (e.g., transimpedance amplifiers) to amplify the analog electrical signals generated by the one or more light sensing elements.

The ADC 140 acquires a sequence of samples $\{I_{MLS}(k)\}$ of the analog electrical signal $I_{MLS}(t)$. Each of the samples may be interpreted as an inner product between a corresponding time slice of the light stream L and a corresponding one of the spatial patterns. The set of samples $\{I_{MLS}(k)\}$ comprises an encoded representation, e.g., a compressed representation, of an image (or a video sequence) and may be used to construct the image (or video sequence) based on any construction algorithm known in the field of compressive sensing. (For video sequence construction, the samples may be partitioned into contiguous subsets, and then the subsets may be processed to construct corresponding images.)

In some embodiments, the samples $\{I_{MLS}(k)\}$ may be used for some purpose other than, or in addition to, image (or video) construction. For example, system 100 (or some other system) may operate on the compensated samples to perform an inference task, such as detecting the presence of a signal or object, identifying a signal or an object, classifying a signal or an object, estimating one or more parameters relating to a signal or an object, tracking a signal or an object, etc. In some embodiments, an object under observation by system 100 may be identified or classified by virtue of its sample set $\{I_{MLS}(k)\}$, or parameters derived from that sample set, being similar to one of a collection of stored sample sets (or parameter sets).

In some embodiments, the light sensing device 130 includes exactly one light sensing element. (For example, the single light sensing element may be a photodiode.) The light sensing element may couple to an amplifier (e.g., a TIA) (e.g., a multi-stage amplifier).

In some embodiments, the light sensing device 130 may include a plurality of light sensing elements (e.g., photodiodes). Each light sensing element may convert light impinging on its light sensing surface into a corresponding analog electrical signal representing intensity of the impinging light as a function of time. In some embodiments, each light sensing element may couple to a corresponding amplifier so that the analog electrical signal produced by the light sensing element can be amplified prior to digitization. System 100 may be configured so that each light sensing element receives, e.g., a corresponding spatial portion (or spectral portion) of the modulated light stream.

In one embodiment, the analog electrical signals produced, respectively, by the light sensing elements may be summed to obtain a sum signal. The sum signal may then be digitized by the ADC 140 to obtain the sequence of samples $\{I_{MLS}(k)\}$. In another embodiment, the analog electrical signals may be individually digitized, each with its own ADC, to obtain corresponding sample sequences. The sample sequences may then be added to obtain the sequence $\{I_{MLS}(k)\}$. In another embodiment, the analog electrical signals produced by the light sensing elements may be sampled by a smaller number of ADCs than light sensing elements through the use of time multiplexing. For example, in one embodiment, system 100 may be configured to sample two or more of the analog electrical signals by switching the input of an ADC among the outputs of the two or more corresponding light sensing elements at a sufficiently high rate.

In some embodiments, the light sensing device 130 may include an array of light sensing elements. Arrays of any of a wide variety of sizes, configurations and material technologies are contemplated. In one embodiment, the light sensing device 130 includes a focal plane array coupled to a readout integrated circuit. In one embodiment, the light sensing device 130 may include an array of cells, where each cell includes a corresponding light sensing element and is configured to integrate and hold photo-induced charge created by the light sensing element, and to convert the integrated charge into a corresponding cell voltage. The light sensing device may also include (or couple to) circuitry configured to sample the cell voltages using one or more ADCs.

In some embodiments, the light sensing device 130 may include a plurality (or array) of light sensing elements, where each light sensing element is configured to receive a corresponding spatial portion of the modulated light stream, and each spatial portion of the modulated light stream comes from a corresponding sub-region of the array of light modulating elements. (For example, the light sensing device 130 may include a quadrant photodiode, where each quadrant of the photodiode is configured to receive modulated light from a corresponding quadrant of the array of light modulating elements. As another example, the light sensing element 130 may include a bi-cell photodiode.) Each light sensing element generates a corresponding signal representing intensity of the corresponding spatial portion as a function of time. Each signal may be digitized (e.g., by a corresponding ADC) to obtain a corresponding sequence of samples. Each sequence of samples may be processed to recover a corresponding sub-image. The sub-images may be joined together to form a whole image.

In some embodiments, the light sensing device 130 includes a small number of light sensing elements (e.g., in respective embodiments, one, two, less than 8, less than 16, less the 32, less than 64, less than 128, less than 256). Because the light sensing device of these embodiments includes a small number of light sensing elements (e.g., far less than the typical modern CCD-based or CMOS-based camera), an entity configuring any of these embodiments may afford to spend more per light sensing element to realize features that are beyond the capabilities of modern array-based image sensors of large pixel count, e.g., features such as higher sensitivity, extended range of sensitivity, new range(s) of sensitivity, extended dynamic range, higher bandwidth/lower response time. Furthermore, because the light sensing device includes a small number of light sensing elements, an entity configuring any of these embodiments may use newer light sensing technologies (e.g., based on new materials or combinations of materials) that are not yet mature enough to be manufactured into focal plane arrays (FPA) with large pixel count. For example, new detector materials such as superlattices, quantum dots, carbon nanotubes and graphene can significantly enhance the performance of IR detectors by reducing detector noise, increasing sensitivity, and/or decreasing detector cooling requirements.

In one embodiment, the light sensing device 130 is a thermo-electrically cooled InGaAs detector. (InGaAs stands for "Indium Gallium Arsenide".) In other embodiments, the InGaAs detector may be cooled by other mechanisms (e.g., liquid nitrogen or a Sterling engine). In yet other embodiments, the InGaAs detector may operate without cooling. In yet other embodiments, different detector materials may be used, e.g., materials such as MCT (mercury-cadmium-telluride), InSb (Indium Antimonide) and VOx (Vanadium Oxide).

In different embodiments, the light sensing device 130 may be sensitive to light at different wavelengths or wavelength ranges. In some embodiments, the light sensing device 130 may be sensitive to light over a broad range of wavelengths, e.g., over the entire visible spectrum or over the entire range $[\lambda_L, \lambda_U]$ as defined above.

In some embodiments, the light sensing device 130 may include one or more dual-sandwich photodetectors. A dual sandwich photodetector includes two photodiodes stacked (or layered) one on top of the other.

In one embodiment, the light sensing device 130 may include one or more avalanche photodiodes.

In some embodiments, a filter may be placed in front of the light sensing device 130 to restrict the modulated light stream to a specific range of wavelengths or polarization. Thus, the signal $I_{MLS}(t)$ generated by the light sensing device 130 may be representative of the intensity of the restricted light stream. For example, by using a filter that passes only IR light, the light sensing device may be effectively converted into an IR detector. The sample principle may be applied to effectively convert the light sensing device into a detector for red or blue or green or UV or any desired wavelength band, or, a detector for light of a certain polarization.

In some embodiments, system 100 includes a color wheel whose rotation is synchronized with the application of the spatial patterns to the light modulation unit. As it rotates, the color wheel cyclically applies a number of optical bandpass filters to the modulated light stream MLS. Each bandpass filter restricts the modulated light stream to a corresponding sub-band of wavelengths. Thus, the samples captured by the ADC 140 will include samples of intensity in each of the sub-bands. The samples may be de-multiplexed to form separate sub-band sequences. Each sub-band sequence may be processed to generate a corresponding sub-band image. (As an example, the color wheel may include a red-pass filter, a green-pass filter and a blue-pass filter to support color imaging.)

In some embodiments, the system 100 may include a memory (or a set of memories of one or more kinds).

Figure 2B:
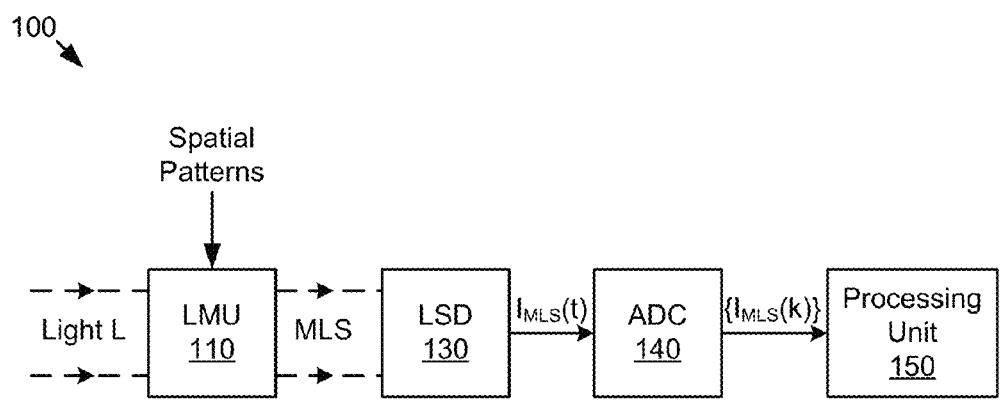
FIG. 2B illustrates an embodiment of system 100 that includes a processing unit 150.

In some embodiments, system 100 may include a processing unit 150, e.g., as shown in FIG. 2B. The processing unit 150 may be a digital circuit or a combination of digital circuits. For example, the processing unit may be a microprocessor (or system of interconnected of microprocessors), a programmable hardware element such as a field-programmable gate array (FPGA), an application specific integrated circuit (ASIC), or any combination such elements. The processing unit 150 may be configured to perform one or more functions such as image/video construction, system control, user interface, statistical analysis, and one or more inferences tasks.

The system 100 (e.g., the processing unit 150) may store the samples $\{I_{MLS}(k)\}$ in a memory, e.g., a memory resident in the system 100 or in some other system.

In one embodiment, processing unit 150 is configured to operate on the samples $\{I_{MLS}(k)\}$ to generate the image or video sequence. In this embodiment, the processing unit 150 may include a microprocessor configured to execute software (i.e., program instructions), especially software for performing an image/video construction algorithm. In one embodiment, system 100 is configured to transmit the compensated samples to some other system through a communication channel. (In embodiments where the spatial patterns are randomly-generated, system 100 may also transmit the random seed(s) used to generate the spatial patterns.) That other system may operate on the samples to construct the image/video. System 100 may have one or more interfaces configured for sending (and perhaps also receiving) data through one or more communication channels, e.g., channels such as wireless channels, wired channels, fiber optic channels, acoustic channels, laser-based channels, etc.

In some embodiments, processing unit 150 is configured to use any of a variety of algorithms and/or any of a variety of transformations to perform image/video construction. System 100 may allow a user to choose a desired algorithm and/or a desired transformation for performing the image/video construction.

In some embodiments, the system 100 is configured to acquire a set $Z_M$ of samples from the ADC 140 so that the sample set $Z_M$ corresponds to M of the spatial patterns applied to the light modulation unit 110, where M is a positive integer. The number M is selected so that the sample set $Z_M$ is useable to construct an n-pixel image or n-voxel video sequence that represents the incident light stream, where n is a positive integer less than or equal to the number N of light modulating elements in the light modulation unit 110. System 100 may be configured so that the number M is smaller than n. Thus, system 100 may operate as a compressive sensing device. (The number of "voxels" in a video sequence is the number of images in the video sequence times the number of pixels per image, or equivalently, the sum of the pixel counts of the images in the video sequence.)

In various embodiments, the compression ratio M/n may take any of a wide variety of values. For example, in different sets of embodiments, M/n may be, respectively, in the range [0.9,0.8], in the range [0.8,0.7], in the range [0.7,0.6], in the range [0.6,0.5], in the range [0.5,0.4], in the range [0.4,0.3], in the range [0.3,0.2], in the range [0.2,0.1], in the range [0.1, 0.05], in the range [0.05,0.01], in the range [0.001,0.01].

As noted above, the image constructed from the sample subset $Z_M$ may be an n-pixel image with n≤N. The spatial patterns may be designed to support a value of n less than N, e.g., by forcing the array of light modulating elements to operate at a lower effective resolution than the physical resolution N. For example, the spatial patterns may be designed to force each 2×2 cell of light modulating elements to act in unison. At any given time, the modulation state of the four elements in a 2×2 cell will agree. Thus, the effective resolution of the array of light modulating elements is reduced to N/4. This principle generalizes to any cell size, to cells of any shape, and to collections of cells with non-uniform cell size and/or cell shape. For example, a collection of cells of size $k_H \times k_v$, where $k_H$ and $k_v$ are positive integers, would give an effective resolution equal to $N/(k_H k_v)$. In one alternative embodiment, cells near the center of the array may have smaller sizes than cells near the periphery of the array.

Another way the spatial patterns may be arranged to support the construction of an n-pixel image with n less than N is to allow the spatial patterns to vary only within a subset of the array of light modulating elements. In this mode of operation, the spatial patterns are null (take the value zero) outside the subset. (Control unit 120 may be configured to implement this restriction of the spatial patterns.) Thus, light modulating elements corresponding to positions outside of the subset do not send any light (or send only the minimum amount of light attainable) to the light sensing device. Thus, the constructed image is restricted to the subset. In some embodiments, each spatial pattern (e.g., of a measurement pattern sequence) may be multiplied element-wise by a binary mask that takes the one value only in the allowed subset, and the resulting product pattern may be supplied to the light modulation unit. In some embodiments, the subset is a contiguous region of the array of light modulating elements, e.g., a rectangle or a circular disk or a hexagon. In some embodiments, the size and/or position of the region may vary (e.g., dynamically). The position of the region may vary in order to track a moving object. The size of the region may vary to dynamically control the rate of image acquisition.

In one embodiment, system 100 may include a light transmitter configured to generate a light beam (e.g., a laser beam), to modulate the light beam with a data signal and to transmit the modulated light beam into space or onto an optical fiber. System 100 may also include a light receiver configured to receive a modulated light beam from space or from an optical fiber, and to recover a data stream from the received modulated light beam.

In one embodiment, system 100 may be configured as a low-cost sensor system having minimal processing resources, e.g., processing resources insufficient to perform image (or video) construction in user-acceptable time. In this embodiment, the system 100 may store and/or transmit the samples $\{I_{MLS}(k)\}$ so that another agent, more plentifully endowed with processing resources, may perform the image/video construction based on the samples.

Figure 2C:
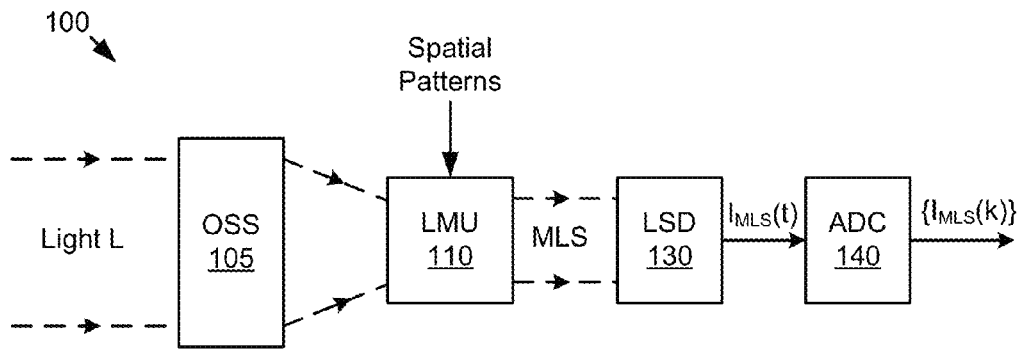
FIG. 2C illustrates an embodiment of system 100 that includes an optical subsystem 105 to focus received light L onto the light modulation unit 110.
Figure 2D:
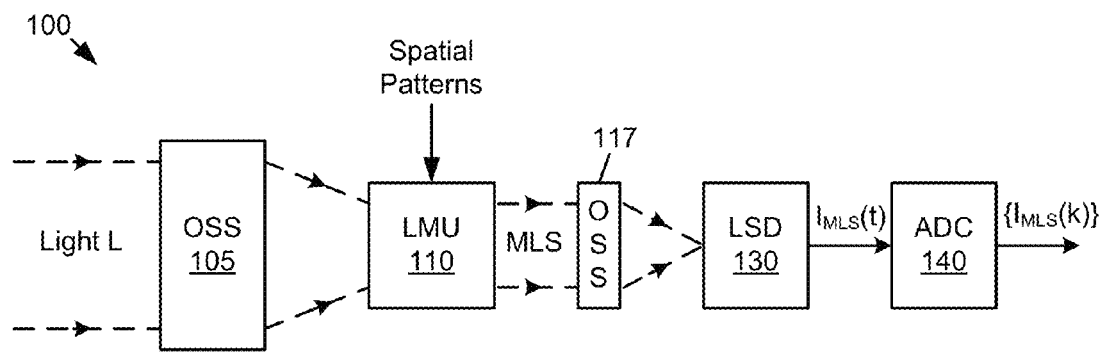
FIG. 2D illustrates an embodiment of system 100 that includes an optical subsystem 117 to direct or focus or concentrate the modulated light stream MLS onto the light sensing device 130.

In some embodiments, system 100 may include an optical subsystem 105 that is configured to modify or condition or operate on the light stream L before it arrives at the light modulation unit 110, e.g., as shown in FIG. 2C. For example, the optical subsystem 105 may be configured to receive the light stream L from the environment and to focus the light stream onto a modulating plane of the light modulation unit 110. The optical subsystem 105 may include a camera lens (or a set of lenses). The lens (or set of lenses) may be adjustable to accommodate a range of distances to external objects being imaged/sensed/captured. In some embodiments, the optical subsystem 105 includes a conventional camera lens unit, e.g., configured for mounting in a standard mount.

In some embodiments, system 100 may include an optical subsystem 117 to direct the modulated light stream MLS onto a light sensing surface (or surfaces) of the light sensing device 130.

In some embodiments, the optical subsystem 117 may include one or more lenses, and/or, one or more mirrors.

In some embodiments, the optical subsystem 117 is configured to focus the modulated light stream onto the light sensing surface (or surfaces). The term "focus" implies an attempt to achieve the condition that rays (photons) diverging from a point on an object plane converge to a point (or an acceptably small spot) on an image plane. The term "focus" also typically implies continuity between the object plane point and the image plane point (or image plane spot)—points close together on the object plane map respectively to points (or spots) close together on the image plane. In at least some of the system embodiments that include an array of light sensing elements, it may be desirable for the modulated light stream MLS to be focused onto the light sensing array so that there is continuity between points on the light modulation unit LMU and points (or spots) on the light sensing array.

In some embodiments, the optical subsystem 117 may be configured to direct the modulated light stream MLS onto the light sensing surface (or surfaces) of the light sensing device 130 in a non-focusing fashion. For example, in a system embodiment that includes only one photodiode, it may not be so important to achieve the "in focus" condition at the light sensing surface of the photodiode since positional information of photons arriving at that light sensing surface will be immediately lost.

In one embodiment, the optical subsystem 117 may be configured to receive the modulated light stream and to concentrate the modulated light stream into an area (e.g., a small area) on a light sensing surface of the light sensing device 130. Thus, the diameter of the modulated light stream may be reduced (possibly, radically reduced) in its transit from the optical subsystem 117 to the light sensing surface (or surfaces) of the light sensing device 130. For example, in some embodiments, the diameter may be reduced by a factor of more than 1.5 to 1. In other embodiments, the diameter may be reduced by a factor of more than 2 to 1. In yet other embodiments, the diameter may be reduced by a factor of more than 10 to 1. In yet other embodiments, the diameter may be reduced by factor of more than 100 to 1. In yet other embodiments, the diameter may be reduced by factor of more than 400 to 1. In one embodiment, the diameter is reduced so that the modulated light stream is concentrated onto the light sensing surface of a single light sensing element (e.g., a single photodiode).

In some embodiments, this feature of concentrating the modulated light stream onto the light sensing surface (or surfaces) of the light sensing device allows the light sensing device to sense, at any given time, the sum (or surface integral) of the intensities of the modulated light portions within the modulated light stream. (Each time slice of the modulated light stream comprises a spatial ensemble of modulated light portions due to the modulation unit's action of applying the corresponding spatial pattern to the light stream.)

In some embodiments, the modulated light stream MLS may be directed onto the light sensing surface of the light sensing device 130 without concentration, i.e., without decrease in diameter of the modulated light stream, e.g., by use of photodiode having a large light sensing surface, large enough to contain the cross section of the modulated light stream without the modulated light stream being concentrated.

Figure 2E:
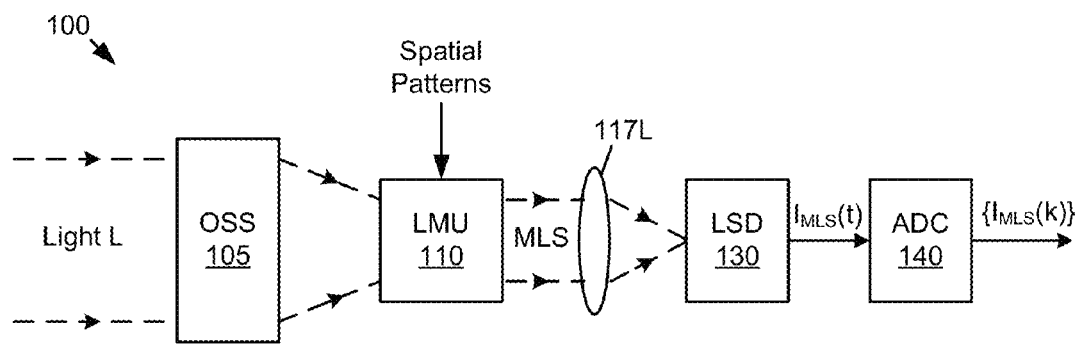
FIG. 2E illustrates an embodiment where the optical subsystem 117 is realized by a lens 117L.

In some embodiments, the optical subsystem 117 may include one or more lenses. FIG. 2E shows an embodiment where optical subsystem 117 is realized by a lens 117L, e.g., a biconvex lens or a condenser lens.

In some embodiments, the optical subsystem 117 may include one or more mirrors. In one embodiment, the optical subsystem 117 includes a parabolic mirror (or spherical mirror) to concentrate the modulated light stream onto a neighborhood (e.g., a small neighborhood) of the parabolic focal point. In this embodiment, the light sensing surface of the light sensing device may be positioned at the focal point.

In some embodiments, system 100 may include an optical mechanism (e.g., an optical mechanism including one or more prisms and/or one or more diffraction gratings) for splitting or separating the modulated light stream MLS into two or more separate streams (perhaps numerous streams), where each of the streams is confined to a different wavelength range. The separate streams may each be sensed by a separate light sensing device. (In some embodiments, the number of wavelength ranges may be, e.g., greater than 8, or greater than 16, or greater than 64, or greater than 256, or greater than 1024.) Furthermore, each separate stream may be directed (e.g., focused or concentrated) onto the corresponding light sensing device as described above in connection with optical subsystem 117. The samples captured from each light sensing device may be used to construct a corresponding image for the corresponding wavelength range. In one embodiment, the modulated light stream is separated into red, green and blue streams to support color (R,G,B) measurements. In another embodiment, the modulated light stream may be separated into IR, red, green, blue and UV streams to support five-channel multi-spectral imaging: (IR, R, G, B, UV). In some embodiments, the modulated light stream may be separated into a number of sub-bands (e.g., adjacent sub-bands) within the IR band to support multi-spectral or hyper-spectral IR imaging. In some embodiments, the number of IR sub-bands may be, e.g., greater than 8, or greater than 16, or greater than 64, or greater than 256, or greater than 1024. In some embodiments, the modulated light stream may experience two or more stages of spectral separation. For example, in a first stage the modulated light stream may be separated into an IR stream confined to the IR band and one or more additional streams confined to other bands. In a second stage, the IR stream may be separated into a number of sub-bands (e.g., numerous sub-bands) (e.g., adjacent sub-bands) within the IR band to support multispectral or hyper-spectral IR imaging.

In some embodiments, system 100 may include an optical mechanism (e.g., a mechanism including one or more beam splitters) for splitting or separating the modulated light stream MLS into two or more separate streams, e.g., where each of the streams have the same (or approximately the same) spectral characteristics or wavelength range. The separate streams may then pass through respective bandpass filters to obtain corresponding modified streams, wherein each modified stream is restricted to a corresponding band of wavelengths. Each of the modified streams may be sensed by a separate light sensing device. (In some embodiments, the number of wavelength bands may be, e.g., greater than 8, or greater than 16, or greater than 64, or greater than 256, or greater than 1024.) Furthermore, each of the modified streams may be directed (e.g., focused or concentrated) onto the corresponding light sensing device as described above in connection with optical subsystem 117. The samples captured from each light sensing device may be used to construct a corresponding image for the corresponding wavelength band. In one embodiment, the modulated light stream is separated into three streams which are then filtered, respectively, with a red-pass filter, a green-pass filter and a blue-pass filter. The resulting red, green and blue streams are then respectively detected by three light sensing devices to support color (R,G,B) acquisition. In another similar embodiment, five streams are generated, filtered with five respective filters, and then measured with five respective light sensing devices to support (IR, R, G, B, UV) multi-spectral acquisition. In yet another embodiment, the modulated light stream of a given band may be separated into a number of (e.g., numerous) sub-bands to support multi-spectral or hyper-spectral imaging.

In some embodiments, system 100 may include an optical mechanism for splitting or separating the modulated light stream MLS into two or more separate streams. The separate streams may be directed to (e.g., concentrated onto) respective light sensing devices. The light sensing devices may be configured to be sensitive in different wavelength ranges, e.g., by virtue of their different material properties. Samples captured from each light sensing device may be used to construct a corresponding image for the corresponding wavelength range.

Figure 2F:
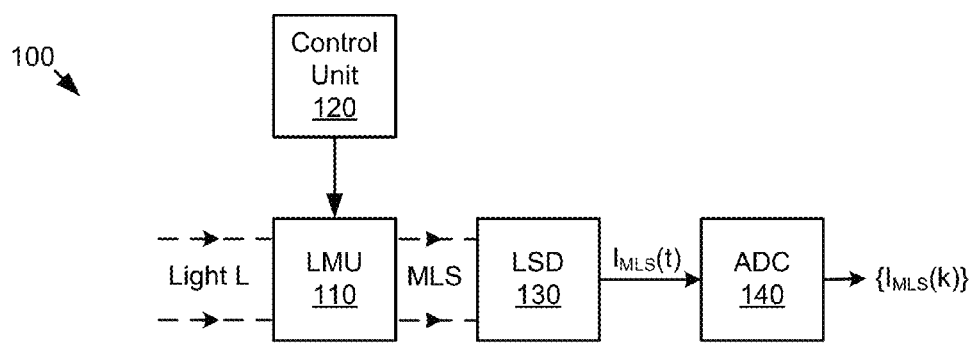
FIG. 2F illustrates an embodiment of system 100 that includes a control unit that is configured to supply a series of spatial patterns to the light modulation unit 110.

In some embodiments, system 100 may include a control unit 120 configured to supply the spatial patterns to the light modulation unit 110, as shown in FIG. 2F. The control unit may itself generate the patterns or may receive the patterns from some other agent. The control unit 120 and the light sensing device 130 may be controlled by a common clock signal so that the light sensing device 130 can coordinate (synchronize) its action of capturing the samples $\{I_{MLS}(k)\}$ with the control unit's action of supplying spatial patterns to the light modulation unit 110. (System 100 may include clock generation circuitry.)

In some embodiment, the control unit 120 may supply the spatial patterns to the light modulation unit in a periodic fashion.

The control unit 120 may be a digital circuit or a combination of digital circuits. For example, the control unit may include a microprocessor (or system of interconnected of microprocessors), a programmable hardware element such as a field-programmable gate array (FPGA), an application specific integrated circuit (ASIC), or any combination such elements.

In some embodiments, the control unit 120 may include a random number generator (RNG) or a set of random number generators to generate the spatial patterns or some subset of the spatial patterns.

In some embodiments, system 100 is battery powered. In some embodiments, the system 100 includes a set of one or more solar cells and associated circuitry to derive power from sunlight.

In some embodiments, system 100 includes its own light source for illuminating the environment or a target portion of the environment.

In some embodiments, system 100 may include a display (or an interface configured for coupling to a display) for displaying constructed images/videos.

In some embodiments, system 100 may include one or more input devices (and/or, one or more interfaces for input devices), e.g., any combination or subset of the following devices: a set of buttons and/or knobs, a keyboard, a keypad, a mouse, a touch-sensitive pad such as a trackpad, a touch-sensitive display screen, one or more microphones, one or more temperature sensors, one or more chemical sensors, one or more pressure sensors, one or more accelerometers, one or more orientation sensors (e.g., a three-axis gyroscopic sensor), one or more proximity sensors, one or more antennas, etc.

Regarding the spatial patterns that are used to modulate the light stream L, it should be understood that there are a wide variety of possibilities. In some embodiments, the control unit 120 may be programmable so that any desired set of spatial patterns may be used.

In some embodiments, the spatial patterns are binary valued. Such an embodiment may be used, e.g., when the light modulating elements are two-state devices. In some embodiments, the spatial patterns are n-state valued, where each element of each pattern takes one of n states, where n is an integer greater than two. (Such an embodiment may be used, e.g., when the light modulating elements are each able to achieve n or more modulation states). In some embodiments, the spatial patterns are real valued, e.g., when each of the light modulating elements admits a continuous range of modulation. (It is noted that even a two-state modulating element may be made to effectively apply a continuous range of modulation by duty cycling the two states during modulation intervals.)

The spatial patterns may belong to a set of measurement vectors that is incoherent with a set of vectors in which the image/video is approximately sparse ("the sparsity vector set"). (See "Sparse Signal Detection from Incoherent Projections", Proc. Int. Conf. Acoustics, Speech Signal Processing—ICASSP, May 2006, Duarte et al.) Given two sets of vectors A={$a_i$} and B={$b_i$} in the same N-dimensional space, A and B are said to be incoherent if their coherence measure μ(A,B) is sufficiently small. The coherence measure is defined as:

$$\mu(A, B) = \max_{i,j} |\langle a_i, b_j \rangle|.$$

The number of compressive sensing measurements (i.e., samples of the sequence $\{I_{MLS}(k)\}$ needed to construct an N-pixel image (or N-voxel video sequence) that accurately represents the scene being captured is a strictly increasing function of the coherence between the measurement vector set and the sparsity vector set. Thus, better compression can be achieved with smaller values of the coherence.

In some embodiments, the measurement vector set may be based on a code. Any of various codes from information theory may be used, e.g., codes such as exponentiated Kerdock codes, exponentiated Delsarte-Goethals codes, run-length limited codes, LDPC codes, Reed Solomon codes and Reed Muller codes.

In some embodiments, the measurement vector set corresponds to a permuted basis such as a permuted DCT basis or a permuted Walsh-Hadamard basis, etc.

In some embodiments, the spatial patterns may be random or pseudo-random patterns, e.g., generated according to a random number generation (RNG) algorithm using one or more seeds. In some embodiments, the elements of each pattern are generated by a series of Bernoulli trials, where each trial has a probability p of giving the value one and probability 1−p of giving the value zero. (For example, in one embodiment p=½.) In some embodiments, the elements of each pattern are generated by a series of draws from a Gaussian random variable.)

The system 100 may be configured to operate in a compressive fashion, where the number of the samples $\{I_{MLS}(k)\}$ captured by the system 100 is less than (e.g., much less than) the number of pixels in the image (or video) to be constructed from the samples. In many applications, this compressive realization is very desirable because it saves on power consumption, memory utilization and transmission bandwidth consumption. However, non-compressive realizations are contemplated as well.

In some embodiments, the system 100 is configured as a camera or imager that captures information representing an image (or a series of images) from the external environment, e.g., an image (or a series of images) of some external object or scene. The camera system may take different forms in different applications domains, e.g., domains such as visible light photography, infrared photography, ultraviolet photography, high-speed photography, low-light photography, underwater photography, multi-spectral imaging, hyper-spectral imaging, etc. In some embodiments, system 100 is configured to operate in conjunction with (or as part of) another system, e.g., in conjunction with (or as part of) a microscope, a telescope, a robot, a security system, a surveillance system, a fire sensor, a node in a distributed sensor network, etc.

In some embodiments, system 100 is configured as a spectrometer.

In some embodiments, system 100 is configured as a multi-spectral or hyper-spectral imager.

In some embodiments, system 100 may also be configured to operate as a projector. Thus, system 100 may include a light source, e.g., a light source located at or near a focal point of optical subsystem 117. In projection mode, the light modulation unit 110 may be supplied with an image (or a video sequence) so that the image (or video sequence) can be displayed on a display surface (e.g., screen).

In some embodiments, system 100 includes an interface for communicating with a host computer. The host computer may send control information and/or program code to the system 100 via the interface. Furthermore, the host computer may receive status information and/or compressive sensing measurements from system 100 via the interface.

Figure 3A:
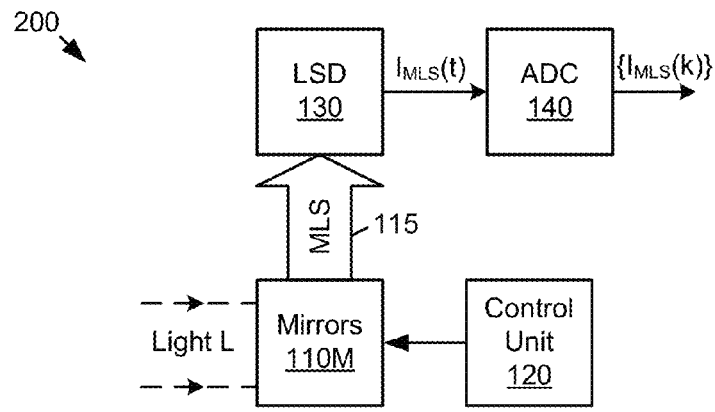
FIG. 3A illustrates system 200, where the light modulation unit 110 is realized by a plurality of mirrors (collectively referenced by label 110M).

In one realization 200 of system 100, the light modulation unit 110 may be realized by a plurality of mirrors, e.g., as shown in FIG. 3A. (The mirrors are collectively indicated by the label 110M.) The mirrors 110M are configured to receive corresponding portions of the light L received from the environment, albeit not necessarily directly from the environment. (There may be one or more optical elements, e.g., one or more lenses along the input path to the mirrors 110M.) Each of the mirrors is configured to controllably switch between two orientation states. In addition, each of the mirrors is configured to (a) reflect the corresponding portion of the light onto a sensing path 115 when the mirror is in a first of the two orientation states and (b) reflect the corresponding portion of the light away from the sensing path when the mirror is in a second of the two orientation states.

In some embodiments, the mirrors 110M are arranged in an array, e.g., a two-dimensional array or a one-dimensional array. Any of various array geometries are contemplated. For example, in different embodiments, the array may be a square array, a rectangular array, a hexagonal array, etc. In some embodiments, the mirrors are arranged in a spatially-random fashion.

The mirrors 110M may be part of a digital micromirror device (DMD). For example, in some embodiments, one of the DMDs manufactured by Texas Instruments may be used.

The control unit 120 may be configured to drive the orientation states of the mirrors through the series of spatial patterns, where each of the patterns of the series specifies an orientation state for each of the mirrors.

The light sensing device 130 may be configured to receive the light portions reflected at any given time onto the sensing path 115 by the subset of mirrors in the first orientation state and to generate an analog electrical signal representing $I_{MLS}(t)$ representing a cumulative intensity of the received light portions as function of time. As the mirrors are driven through the series of spatial patterns, the subset of mirrors in the first orientation state will vary from one spatial pattern to the next. Thus, the cumulative intensity of light portions reflected onto the sensing path 115 and arriving at the light sensing device will vary as a function time. Note that the term "cumulative" is meant to suggest a summation (spatial integration) over the light portions arriving at the light sensing device at any given time. This summation may be implemented, at least in part, optically (e.g., by means of a lens and/or mirror that concentrates or focuses the light portions onto a concentrated area as described above).

Figure 3B:
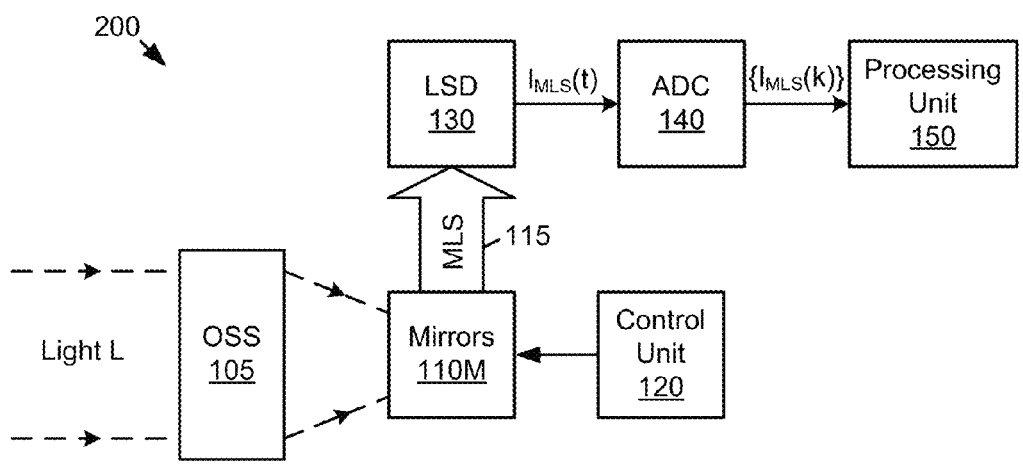
FIG. 3B shows an embodiment of system 200 that includes the processing unit 150.

System realization 200 may include any subset of the features, embodiments and elements discussed above with respect to system 100. For example, system realization 200 may include the optical subsystem 105 to operate on the incoming light L before it arrives at the mirrors 110M, e.g., as shown in FIG. 3B.

Figure 4:
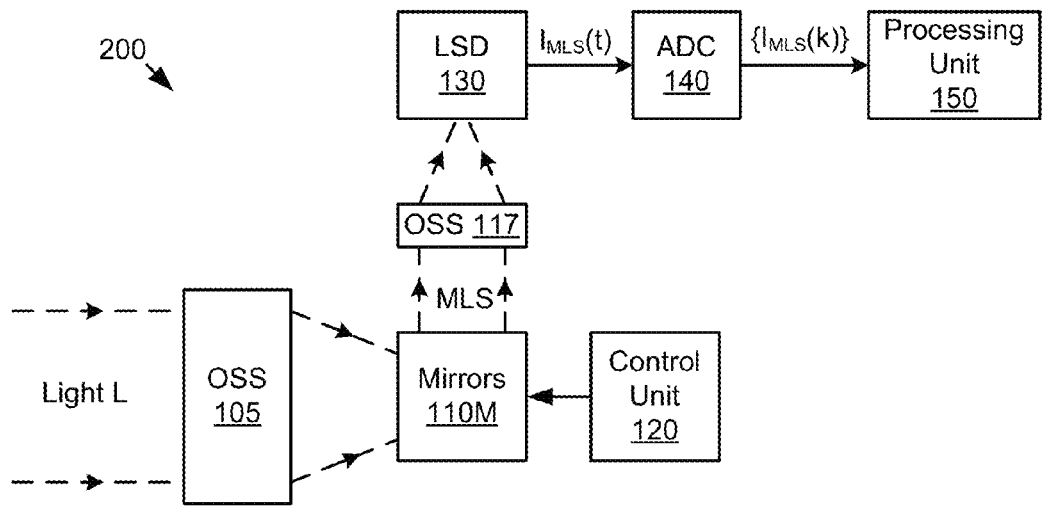
FIG. 4 shows an embodiment of system 200 that includes the optical subsystem 117 to direct or focus or concentrate the modulated light stream MLS onto the light sensing device 130.
Figure 5A:
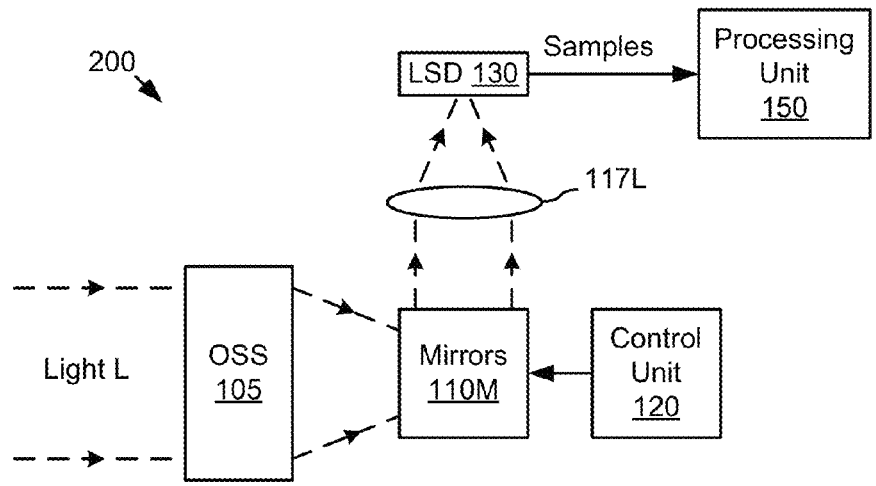
FIG. 5A shows an embodiment of system 200 where the optical subsystem 117 is realized by the lens 117L.

In some embodiments, system realization 200 may include the optical subsystem 117 along the sensing path as shown in FIG. 4. The optical subsystem 117 receives the light portions reflected onto the sensing path 115 and directs (e.g., focuses or concentrates) the received light portions onto a light sensing surface (or surfaces) of the light sensing device 130. In one embodiment, the optical subsystem 117 may include a lens 117L, e.g., as shown in FIG. 5A.

Figure 5B:
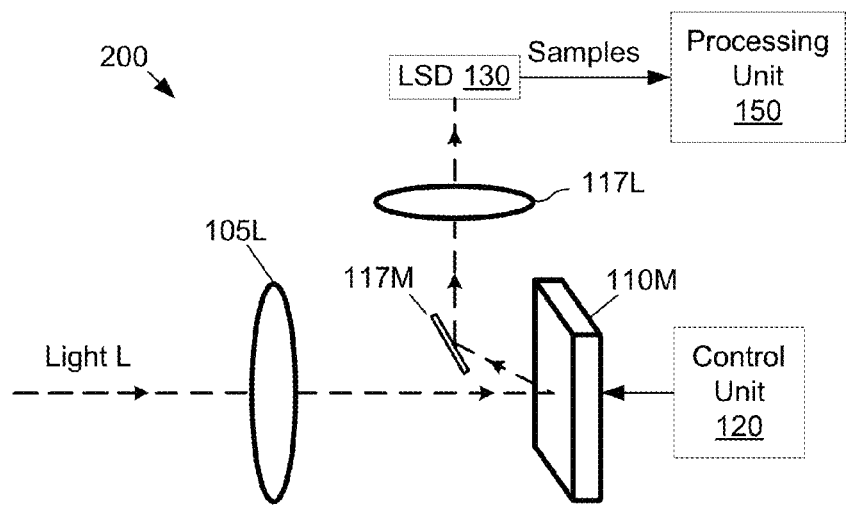
FIG. 5B shows an embodiment of system 200 where the optical subsystem 117 is realized by a mirror 117M and lens 117L in series.

In some embodiments, the optical subsystem 117 may include one or more mirrors, e.g., a mirror 117M as shown in FIG. 5B. Thus, the sensing path may be a bent path having more than one segment. FIG. 5B also shows one possible embodiment of optical subsystem 105, as a lens 105L.

Figure 5C:
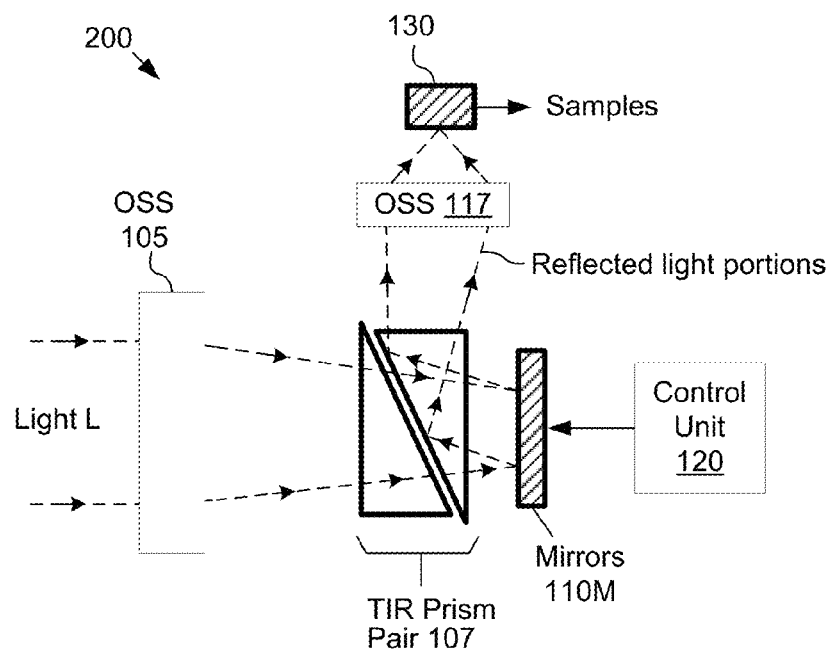
FIG. 5C shows another embodiment of system 200 that includes a TIR prism pair 107.

In some embodiments, there may be one or more optical elements intervening between the optical subsystem 105 and the mirrors 110M. For example, as shown in FIG. 5C, a TIR prism pair 107 may be positioned between the optical subsystem 105 and the mirrors 110M. (TIR is an acronym for "total internal reflection".) Light from optical subsystem 105 is transmitted through the TIR prism pair and then interacts with the mirrors 110M. After having interacted with the mirrors 110M, light portions from mirrors in the first orientation state are reflected by a second prism of the pair onto the sensing path 115. Light portions from mirrors in the second orientation state may be reflected away from the sensing path.

TIR Prism Pair for Separating Incident Light from Modulated Light

Figure 6:
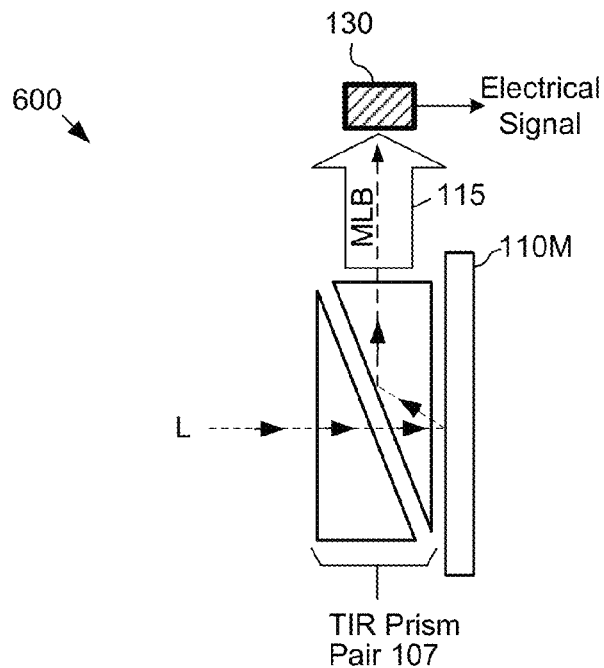
FIG. 6 illustrates an embodiment of a system 600 for separating incident light and modulated light using a TIR prism pair 107.
Figure 7:
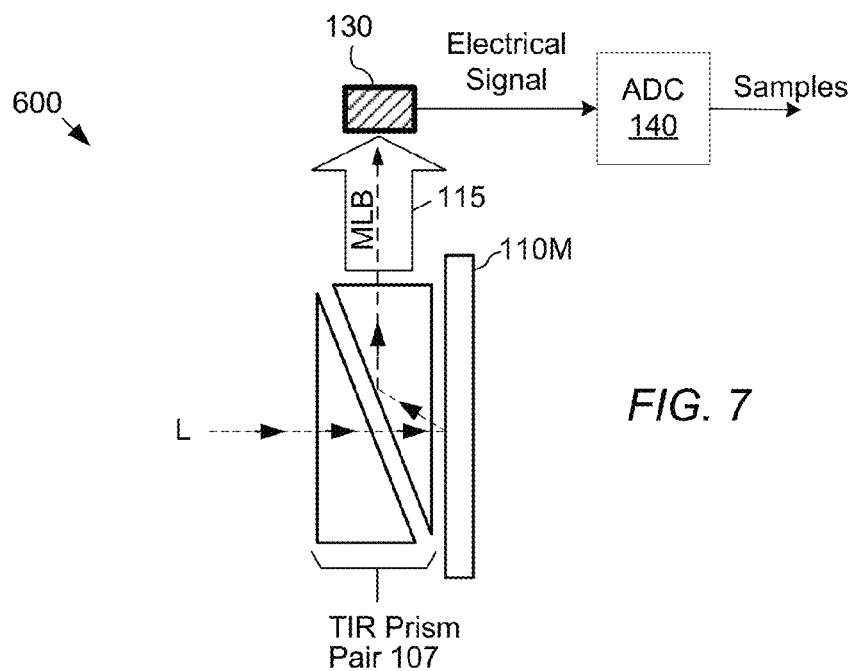
FIG. 7 illustrates an embodiment of a system 600 including an ADC 140.

In one set of embodiments, a system 600 may be configured as shown in FIG. 6. System 600 includes the light modulation unit 110M, the TIR prism pair 107 and the light sensing device 130 as described above. (Furthermore, system 600 may include any subset of the feature, embodiments and elements described above in connection with system 100 and system realization 200.)

The light modulation unit 110M includes an array of mirrors, where each of the mirrors is configured to controllably switch between two orientation states, e.g., as variously described above.

The TIR prism pair 107 is configured to receive an incident light beam L and output the incident light beam to (or in the direction of) the array of mirrors. The TIR prism pair is further configured to receive a modulated light beam (MLB) from the array of mirrors, totally internally reflect the modulated light beam, and output the modulated light beam onto the sensing path 115. The array of mirrors is configured to produce the modulated light beam MLB by modulating the incident light beam as received from the TIR prism pair, e.g., by applying a sequence of spatial patterns to the incident light beam as variously described above.

The light sensing device 130 is configured to receive at least a portion of the modulated light beam MLB from the sensing path 115. The light sensing device is configured to generate an electrical signal representing intensity of that "at least a portion" of the modulated light beam as a function of time. In some embodiments, the light sensing device is configured to receive a spatial portion of the modulated light beam, e.g., as described in U.S. patent application Ser. No. 13/197,304, filed on Aug. 3, 2011, titled "Decreasing Image Acquisition Time for Compressive Imaging Devices", invented by Woods et al., which is hereby incorporated by reference in its entirety as though fully and completely set forth herein. System 600 may include any subset of the features, embodiments and elements disclosed in that patent application.

In other embodiments, the light sensing device 130 is configured to receive a spectral portion of the modulated light beam.

In other embodiments, the light sensing device 130 is configured to receive the whole of the modulated light beam.

In some embodiments, the system 600 may also include the analog-to-digital converter (ADC) 140. The ADC 140 is configured to acquire samples of the electrical signal.

As noted above, the incident light stream is modulated by the array of mirrors. The action of modulating the incident light beam L comprises modulating the incident light beam with a sequence of spatial patterns. The spatial patterns are configured so that a set of the samples (acquired by the ADC), corresponding to M of the spatial patterns, is usable to construct an n-pixel image or n-voxel video sequence that represents at least a portion of the incident light stream. The system may be configured so that M is less than n, perhaps much less than n, e.g., as variously described above. The portion of the incident light beam that is represented by the constructed image/video corresponds to the portion of the modulated light beam sensed by the light sensing device 130. For example, if the light sensing device receives the whole of the modulated light beam, then the constructed image/video represents the whole of the incident light beam. As another example, if the light sensing device receives a quadrant of the modulated light beam, then the constructed image/video represents a corresponding quadrant of the incident light beam. As yet another example, if the light sensing device receives a wavelength band of the modulated light beam, then the constructed image/video represents the corresponding wavelength band of the incident light beam.

The modulated light beam at any given time includes pieces of the incident light beam that are reflected by mirrors in a first of the two orientation states at that time, and does not include pieces of the incident light beam that are reflected by mirrors in a second of the two orientation states at that time. The first orientation state may be referred to herein as the "ON" state; the second orientation state may be referred to as the "OFF" state.

Figure 8:
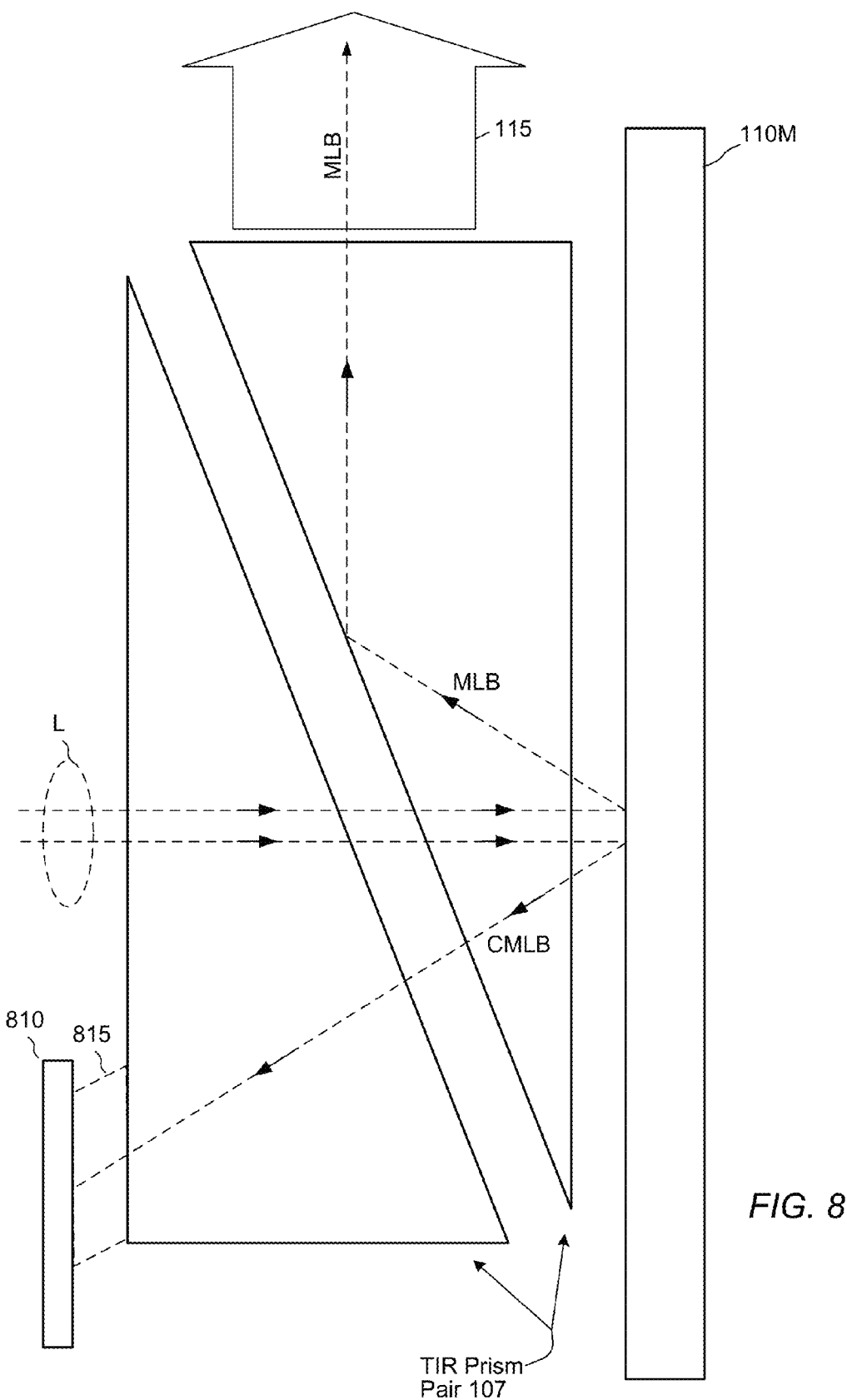
FIG. 8 illustrates the path of the complementary modulated light beam through the TIR prism pair, according to one embodiment.

The TIR prism pair is configured to receive a complementary modulated light beam CMLB from the array of mirrors and to output the complementary modulated light beam onto an alternative path 815 which is different from the sensing path 115, e.g., as shown in FIG. 8. The alternative path may terminate onto a light absorbing device 810 such as a beam block or baffle, e.g., so the complementary modulated light beam doesn't bounce around inside a housing of the system 600 and contribute to noise at the light sensing device. The complementary modulated light beam at any given time includes the pieces of the incident light beam L that are reflected by the mirrors in the second orientation state at that time, and does not include the pieces of the incident light beam that are reflected by the mirrors in the first orientation state at that time.

Figure 9:
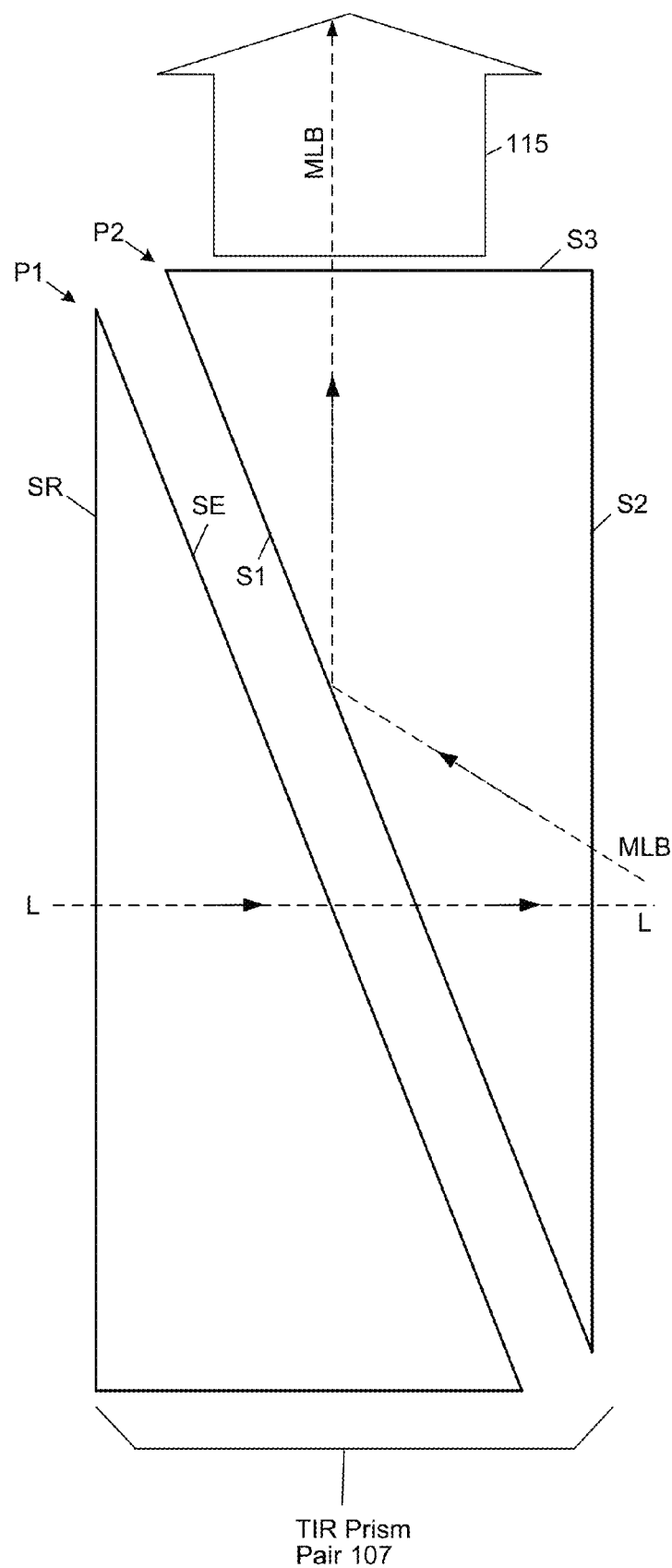
FIG. 9 illustrates the incident light beam and the modulated light beam (MLB) traversing various surfaces of the TIR prism pair 107, according to one embodiment.

The TIR prism pair 107 may include a first prism P1 and a second prism P2, e.g., as shown in FIG. 9. The first prism P1 has a receiving surface SR and an exiting surface SE. The second prism P2 has a first surface S1, a second surface S2 and a third surface S3. The TIR prism pair is configured so that the incident light beam L enters the first prism through the receiving surface RS, exits the first prism through the exiting surface SE, enters the second prism through the first surface S1, and exits the second prism through the second surface S2. The TIR prism pair is further configured so that the modulated light beam MLB from the array of mirrors enters the second prism through the second surface S2, experiences total internal reflection at the first surface S1, and then exits at the third surface S3. The angle of incidence of the modulated light beam MLB at the second surface S2 is different from the exit angle of the incident light beam L at that surface because of the angular orientation of the mirrors in the first orientation state (the ON-state mirrors). Recall the mirrors in the first orientation state are the mirrors that generate the modulated light beam.

TIR prism pairs (in the field of optics, often referred to simply as "TIR prisms") may be purchased from any of a variety of manufacturers or vendors, e.g., EIS Optics (see their LightGate™ TIR Prism) and Vikuiti™.

The size of the air gap shown in FIG. 9 (and other figures included herein) is not meant to be limiting. Indeed, the size of the air gap is purposely exaggerated here for the sake of discussion. In different sets of embodiments, the size of the air gap in microns may be, respectively, in the range [0,1], in the range [1,5], in the range [5,9], in the range [9,15], in the range [15, 20], in the range [20,40], in the range [40,160], in the range [160,640], greater than 640.

Figure 10:
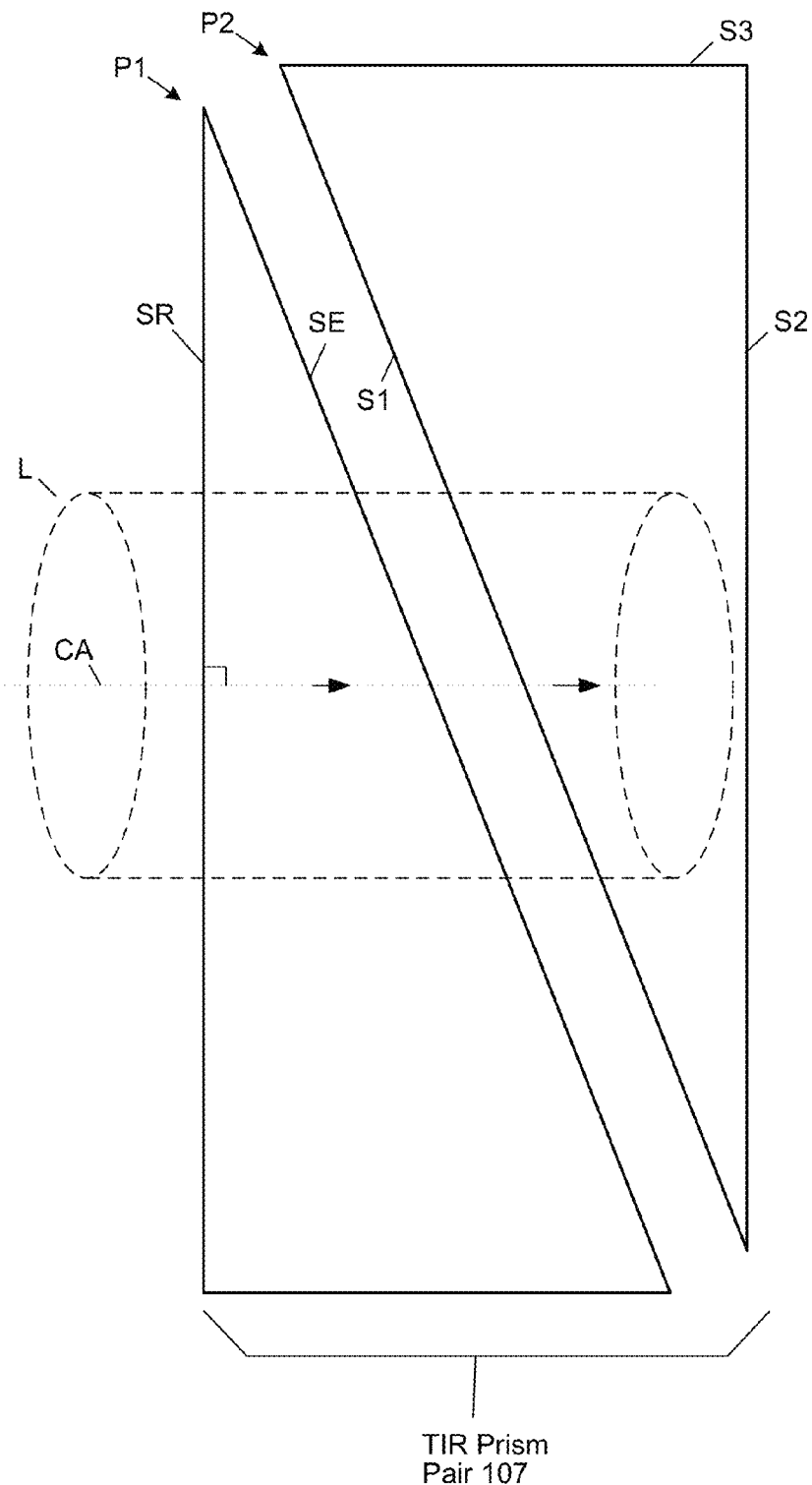
FIG. 10 illustrates the orthogonality of the receiving surface SR and a central axis of the incident light beam, according to one embodiment.

In some embodiments, the receiving surface SR is substantially perpendicular to a central axis CA of the incident light beam L, e.g., as suggested in FIG. 10.

In different embodiments, the term "substantially perpendicular" might have different meanings, in terms of the maximum about of angular deviation from true perpendicularity that is tolerated. For example, in different sets of embodiments, the angular deviation may be, respectively, no more than 8 degrees, no more than 4 degrees, no more than 2 degrees, no more than 1.0 degrees, no more than 0.5 degrees, no more than 0.25 degrees, no more than 1/8 degrees, no more than 1/16 degrees, no more than 1/32 degrees, no more than 1/128 degrees, no more than 1/512 degrees, no more then 1/2048 degrees, no more than $2^{-13}$ degrees.

In some embodiments, the exiting surface SE of the first prism is substantially parallel to the first surface S1 of the second prism.

In different embodiments, the term "substantially parallel" might have different meanings, in terms of the maximum about of angular deviation from true parallelism that is tolerated. For example, in different sets of embodiments, the angular deviation may be, respectively, no more than 8 degrees, no more than 4 degrees, no more than 2 degrees, no more than 1.0 degrees, no more than 0.5 degrees, no more than 0.25 degrees, no more than 1/8 degrees, no more than 1/16 degrees, no more than 1/32 degrees, no more than 1/128 degrees, no more than 1/512 degrees, no more then 1/2048 degrees, no more than $2^{-13}$ degrees.

In some embodiments, the second surface S2 of the second prism is substantially parallel to a plane of the array of mirrors.

It should be noted that the specific geometry of the prisms shown in the Figures is not meant to be limiting. The prisms are not necessarily right angle prisms. The angles may be determined by a number of factors including factors such as prism size and width, the angular extent of the cone of light traveling through the prism, the wavelength of the light, the material of the prism, and the direction the light is reflected from the modulator.

Figure 11:
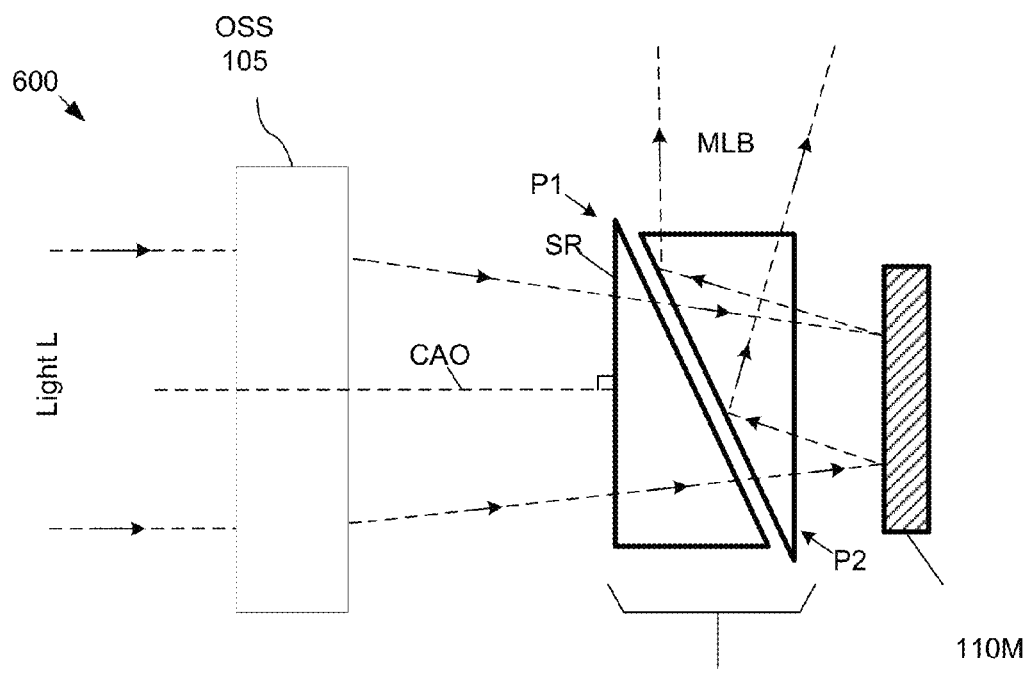
FIG. 11 illustrates one embodiment of system 600 including optical subsystem 105.

In some embodiments, system 600 also includes the input optical subsystem 105 described above. The input optical subsystem 105 may be configured to receive the incident light beam L and to provide the incident light beam to the receiving surface of the first prism, e.g., as shown in FIG. 11 (or in FIG. 5C). The receiving surface SR may be perpendicular to a central axis CAO of the optical subsystem 105, e.g., as shown in FIG. 11. The input optical subsystem may be configured so that the incident light beam is in focus at the array of mirrors. In some embodiments, the input optical subsystem has an adjustable focus mechanism so that it can focus on objects at a range of distances from the system.

In some embodiments, the TIR prism 107 may be used to decrease (or minimize) the distance required to separate the incident light beam L from the modulated light beam MLB produced by the light modulation unit 110, so that typical lens mount distances can be used. The TIR prism pair may also be used to decrease (or minimize) the length of the optical path, and thus, decrease (or minimize) the total size of the system 600.

The system 600 preferably includes a housing. In some embodiments, the housing has a standard lens mount and optical subsystem 105 is configured for mounting in that standard mount. For example, any of various mounts may be used, e.g., mounts such as Canon EF, Canon EF-S, Canon FD, Canon FL, Contax N, Contax/Yashica bayonet, Contax rf bayonet, Four Thirds System, Fujica X bayonet, Konica F-mount, Konica AR-mount, Leica M mount, Leica M39 screw mount, Leica R bayonet, M42, Mamiya bayonet, Minolta AF, Minolta V, Minolta MD, Miranda bayonet, Nikon F, Nikon S, Olympus OM, Pentacon 6/P6, Pentax K, Sigma SA, Samsung NX, T-mount (T-thread), Yashica AF, Aaton universal, Arri bayonet, Arri PL, Arri standard, B4, BNCR, CA-1, PV (Panavision), Universal, Micro Four Thirds System, Sony E mount, C mount, CS mount, T-mount (T-thread), S mount (M12 thread), Front-plate mount. (This list is not meant to be exhaustive. System 600 may use any lens mount.)

Figure 12:
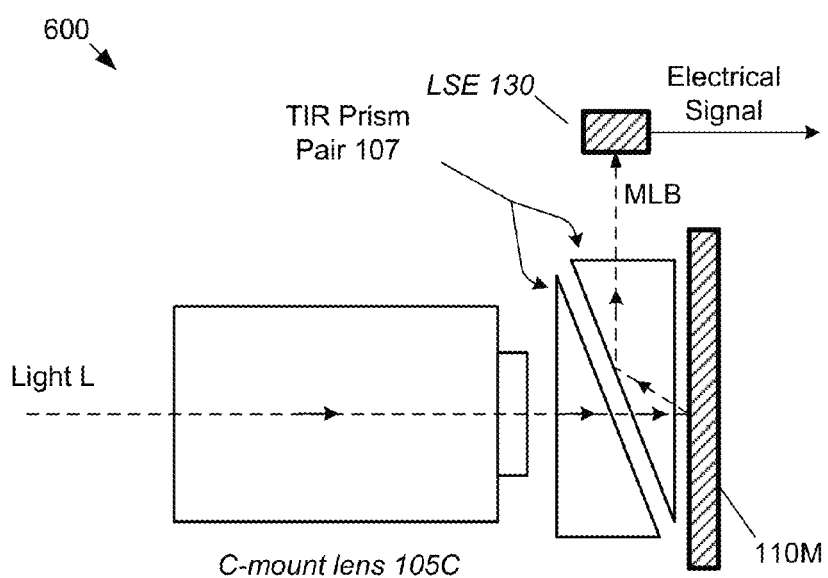
FIG. 12 illustrates one embodiment of system 600 including a C mount lens.
Figure 13:
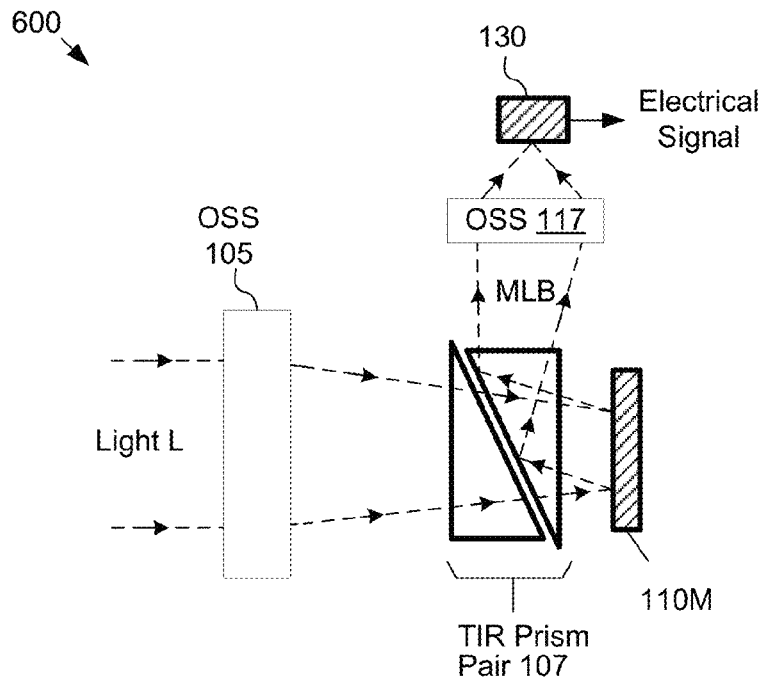
FIG. 13 illustrates one embodiment of system 600 including optical subsystem 117.

In one embodiment, system 600 includes a C-mount lens, as shown in FIG. 12, and the housing includes a C-mount (not shown). The C-mount implies 17.5 mm between the lens and the image plane. However, other lens mounts have different distances.

Custom lenses may have any specified distance between the lens and the image plane, based on their design. In some embodiments, input optical subsystem 105 includes one or more custom lenses.

In some embodiments, the housing has a non-standard lens mount.

In some embodiments, system 600 includes the optical subsystem 117 as described above. Optical subsystem 117 may be configured to direct or concentrate or focus the modulated light beam onto a light sensing surface of the light sensing device 130. In some embodiments, optical subsystem 117 may be configured to deliver a spatial portion of the modulated light beam to the light sensing device 130, e.g., as variously described in U.S. patent application Ser. No. 13/197,304. (See especially the teachings regarding optical subsystem 620 in that patent application.) In some embodiments, system 600 may be configured to deliver a spectral portion (slice) of the modulated light beam to the light sensing device 130.

Figure 14:
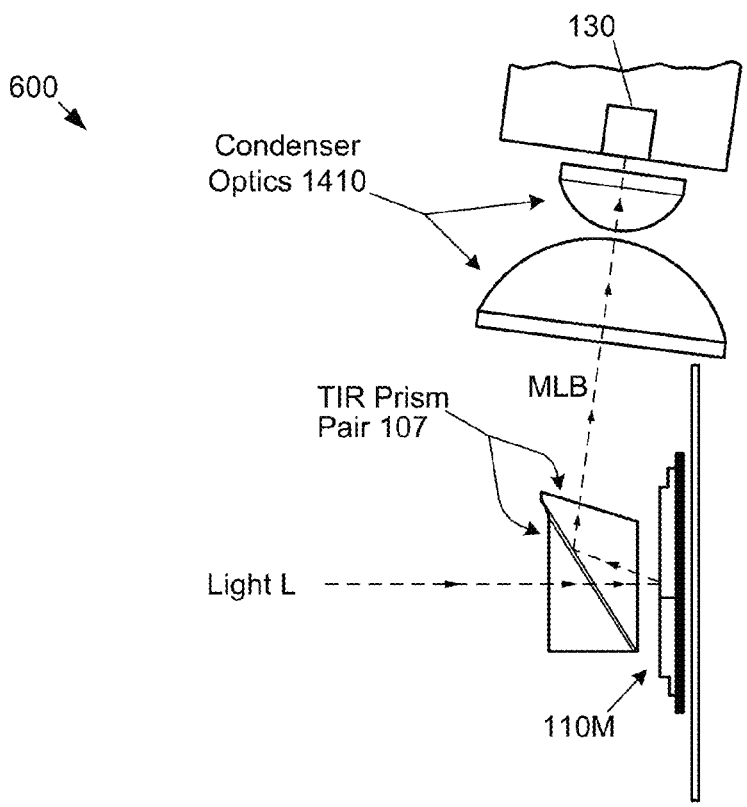
FIG. 14 illustrates one embodiment of system 600 including condenser optics 1410.

In some embodiments, optical subsystem 117 includes the condenser optics 1410 as shown in FIG. 14. The condenser optics may be configured to concentrate the modulated light beam MLB onto a light sensing surface of the light sensing device 130. The condenser optics may include a plano-convex condenser of spherical or aspherical shape, a bi-convex lens of spherical or aspherical shape or a set of two or more lenses whose combined action produces the desired effective optical aperture and focal length.

Figure 15:
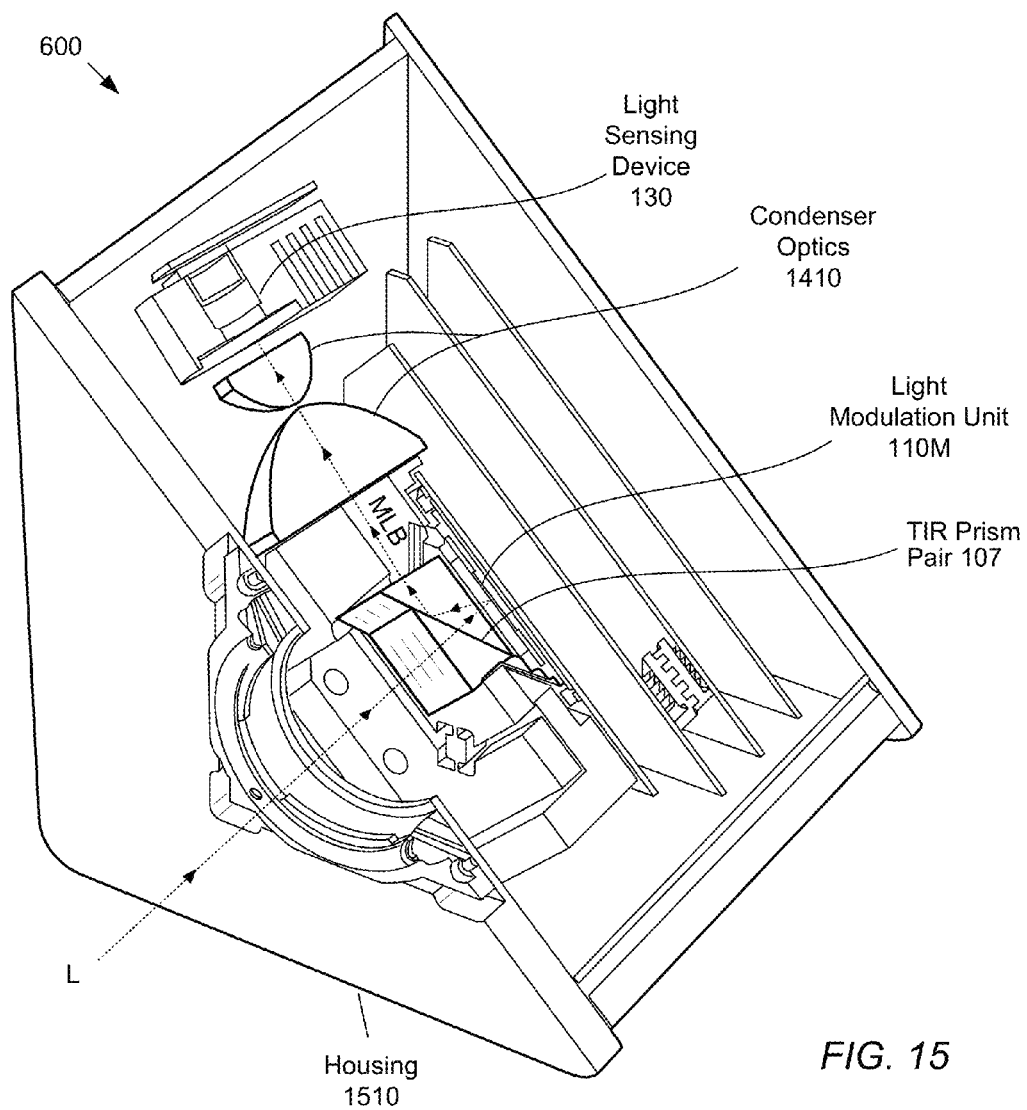
FIG. 15 illustrates a 3D cut-away view of one embodiment of system 600.

In some embodiments, system 600 may be configured as shown in FIG. 15. FIG. 15 is a 3D cut-away view showing the path of the incident light beam L and the modulated light beam MLB through the system 600.

In some embodiments, the TIR prism pair is configured to minimize aberration in the image transmitted through it in the incoming direction and at the same time maximize reflectivity of the modulated image reflected from the DMD over a cone of angles defined by the system f-number, also over a spatial area defined by the image size on the DMD and/or the DMD area and also over the optical wavelength range used in the system. The design may optimize the lateral extent of the TIR prism pair and its total thickness, the interface angle, separation distance and material selection closely with the design of optical subsystem 105 (e.g., an imaging lens) in order to maximize throughput of modulated light into the sensing path. Furthermore, it is desirable to minimize differences in optical loss as a function of image position on the DMD in order to maintain uniformity across the entire field.

Figure 16:
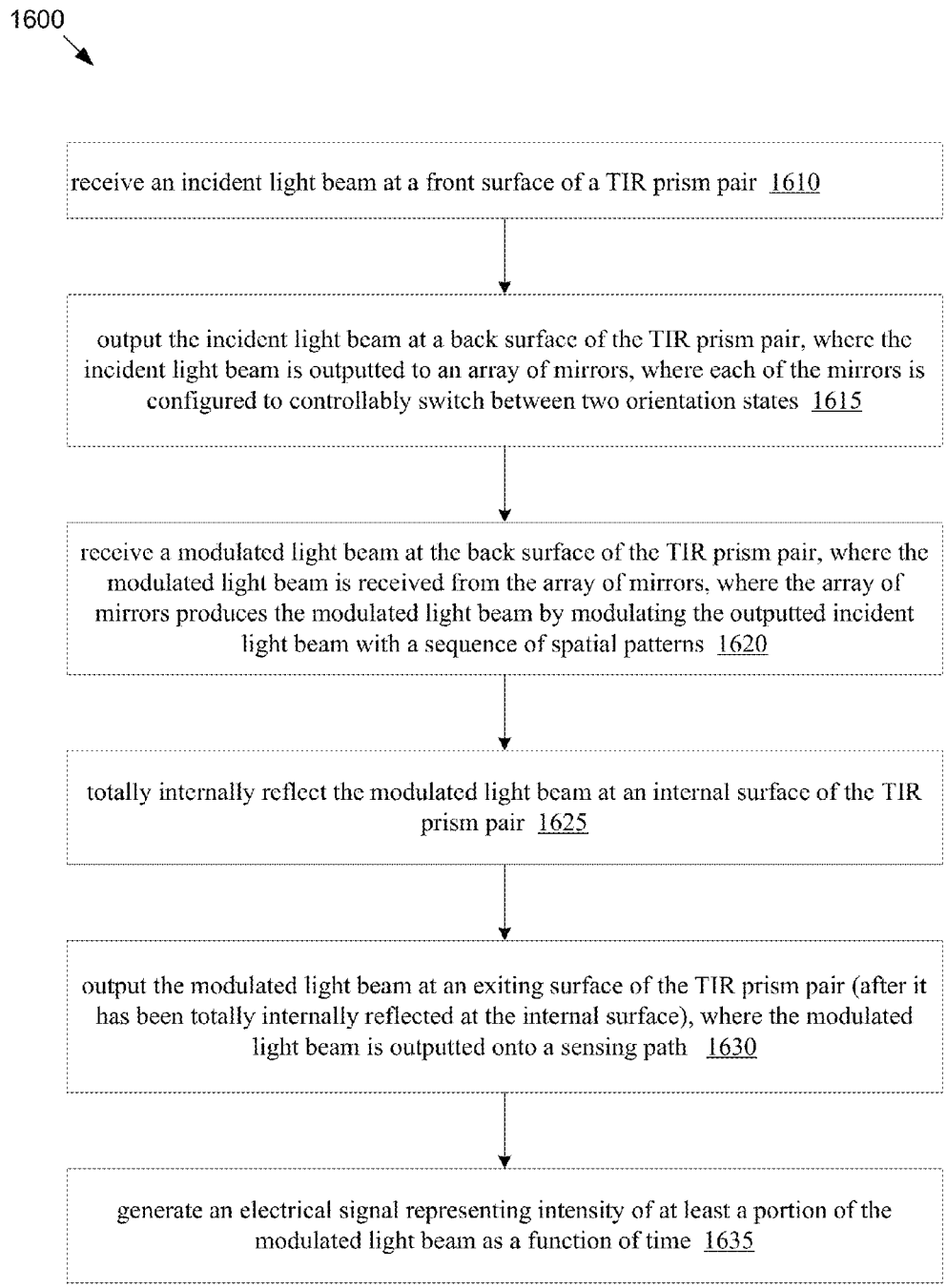
FIG. 16 illustrates one embodiment of a method for separating incident light and modulated light using a TIR prism pair (e.g., TIR prism pair 107).

In one set of embodiments, a method 1600 may include the actions shown in FIG. 16. Method 1600 may be performed using system 600 described above, in any of its various embodiments.

Action 1610 includes receiving an incident light beam at a front surface of a TIR prism pair.

Action 1615 includes outputting the incident light beam at a back surface of the TIR prism pair, where the incident light beam is outputted to an array of mirrors, where each of the mirrors is configured to controllably switch between two orientation states.

Action 1620 includes receiving a modulated light beam at the back surface of the TIR prism pair, where the modulated light beam is received from the array of mirrors, where the array of mirrors produces the modulated light beam by modulating the incident light beam (as outputted from the back surface of the TIR prism pair) with a sequence of spatial patterns.

Action 1625 includes totally internally reflecting the modulated light beam at an internal surface of the TIR prism pair (i.e., the first surface S1 of FIG. 9).

Action 1630 includes outputting the modulated light beam at an exiting surface (after it has been totally internally reflected at the internal surface) of the TIR prism pair, where the modulated light beam is outputted onto a sensing path.

Actions 1610 through 1630 are performed by the TIR prism pair.

Action 1635 includes generating an electrical signal representing intensity of at least a portion of the modulated light beam as a function of time. As described above, the "at least a portion" of the modulated light beam may be a spatial portion or a spectral portion or the whole of the modulated light beam.

Figure 17:
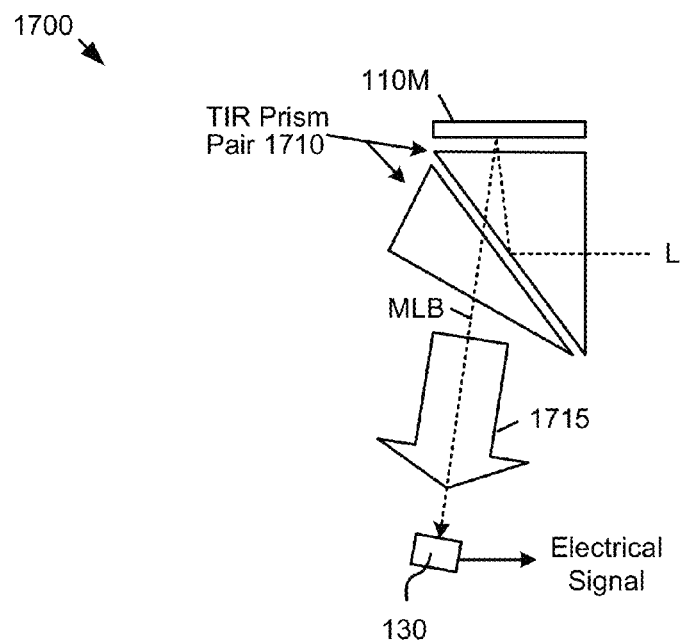
FIG. 17 illustrates one embodiment of a system 1700 for separating incident light and modulated light using a TIR prism pair 1710.

In one set of embodiments, a system 1700 may be configured as shown in FIG. 17. System 1700 may include the light modulation unit 110M and the light sensing device 130 as described above, and may also include the TIR prism pair 1710. (Furthermore, system 600 may include any subset of the feature, embodiments and elements described above in connection with system 100, system realization 200 and system 600.)

The light modulation unit 110M includes an array of mirrors, where each of the mirrors is configured to controllably switch between two orientation states, e.g., as variously described above.

The TIR prism pair 1715 is configured to receive an incident light beam L and to totally internally reflect the incident light beam prior to outputting the incident light beam to the array of mirrors. The TIR prism pair is further configured to receive a modulated light beam MLB from the array of mirrors and output the modulated light beam onto a sensing path 1715. The array of mirrors is configured to produce the modulated light beam by modulating the incident light beam as received from the TIR prism pair, e.g., as variously described above.

TIR prism pairs (in the field of optics, often referred to simply as "TIR prisms") may be purchased from any of a variety of manufacturers or vendors, e.g., Vikuiti™ (see the Vikuiti™ TIR Prism) and EIS Optics.

The light sensing device 130 is configured to receive at least a portion of the modulated light beam from the sensing path 1715. The light sensing device is configured to generate an electrical signal representing intensity of said at least a portion of the modulated light beam as a function of time. As variously described above, the portion may be a spatial portion or a spectral portion or the whole of the modulated light beam.

In some embodiments, system 1700 may also include the analog-to-digital converter (ADC) 140. ADC 140 is configured to acquire samples of the electrical signal.

As noted above, the incident light stream is modulated by the array of mirrors. The action of modulating the incident light beam comprises modulating the incident light beam with a sequence of spatial patterns. The spatial patterns may be configured so that a set of the samples (acquired by the ADC), corresponding to M of the spatial patterns, is usable to construct an n-pixel image or n-voxel video sequence representing at least a portion of the incident light beam. The system 1700 may be configured so that M is less than n, perhaps much less than n, e.g., as variously described above. The portion of the incident light beam that is represented by the constructed image/video corresponds to the portion of the modulated light beam sensed by the light sensing device 130.

In some embodiments, the modulated light beam at any given time includes pieces of the incident light beam that are reflected by mirrors in a first of the two orientation states at that time, and does not include pieces of the incident light beam that are reflected by mirrors in a second of the two orientation states at that time.

Figure 18:
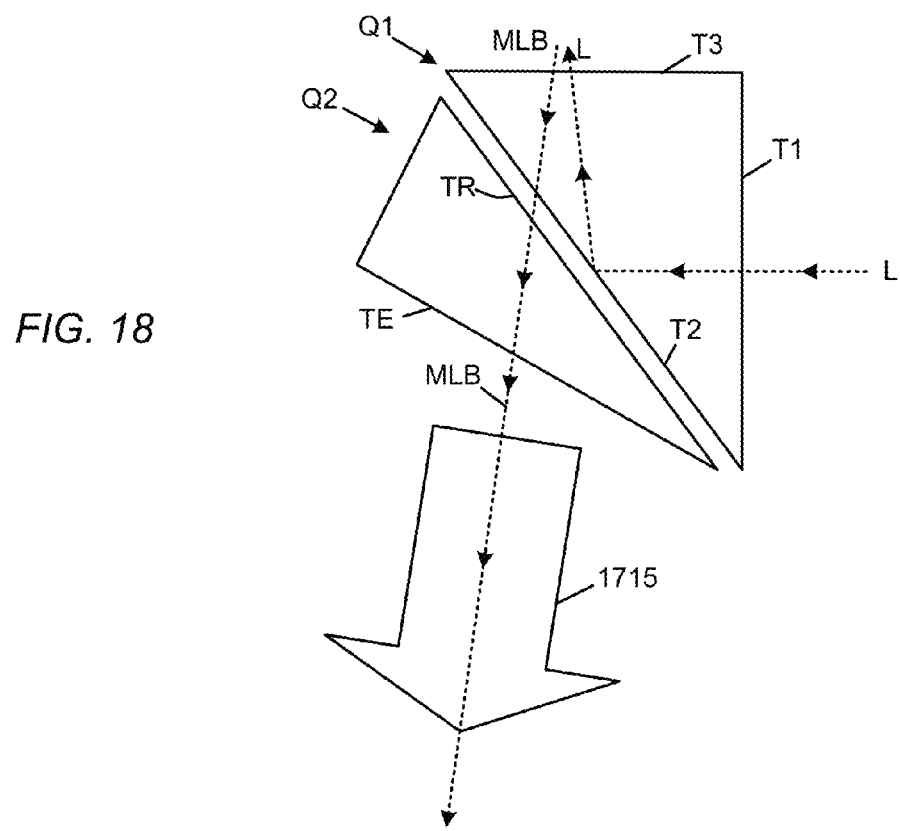
FIG. 18 illustrates the incident light beam and modulated light beam traversing various surfaces of the TIR prism pair 1710.

In some embodiments, the TIR prism pair includes a first prism Q1 and a second prism Q2, as shown in FIG. 18. The first prism includes a first T1, a second surface T2 and a third surface T3. The second prism includes a receiving surface TR and an exiting surface TE.

The TIR prism pair is configured so that the incident light beam L enters the first prism through the first surface T1, experiences total internal reflection (internal to the first prism) at the second surface T2, and exits the first prism at the third surface T3. The TIR prism pair is further configured so that the modulated light beam MLB enters the first prism at the third surface T3, exits the first prism at the second surface T2, enters the second prism at the receiving surface TR and exits the second prism at the exiting surface TE. The air gap between the prisms may be as variously described above.

In some embodiments, the first surface T1 is substantially perpendicular to a central axis of the incident light beam, or a central axis of an input output subsystem 105 as described above.

In some embodiments, the third surface T3 is substantially parallel to the array of mirrors.

In some embodiments, the input optical subsystem 105 may be configured to receive the incident light beam and optically modify the incident light beam so the incident light beam is in focus at a plane of the array of mirrors.

In some embodiments, system 1700 include the optical subsystem 1700 positioned along the sensing path 1715, between the TIR prism pair and the light sensing device 130, e.g., as variously described above.

In one set of embodiments, a method 1900 may include the actions shown in FIG. 1900. The method may be performed using the system 1700, in any of its various embodiments.

Action 1910 includes receiving an incident light beam L at a first surface of a TIR prism pair.

Action 1915 includes totally internally reflecting the incident light beam at a second surface of the TIR prism pair prior to outputting the incident light beam at a third surface of the TIR prism pair. The incident light beam is outputted to an array of mirrors. Each of the mirrors is configured to controllably switch between two orientation states.

Action 1920 includes receiving a modulated light beam at the third surface of the TIR prism pair. The modulated light beam is received from the array of mirrors. The array of mirrors produces the modulated light beam by modulating the incident light beam as received from the TIR prism pair, e.g., as variously described above.

Action 1925 includes outputting the modulated light beam at an exiting surface, where the modulated light beam is outputted onto a sensing path, e.g., as described above.

Actions 1910 through 1925 are performed by the TIR prism pair.

Action 1930 includes generating an electrical signal representing intensity of at least a portion of the modulated light beam as a function of time. As described above, the "at least a portion" may be spatial portion or a spectral portion or the whole of the modulated light beam or the whole of the modulated light beam.

Dual TIR Prism to Separate Incident Light from On-State Reflection and Off-State Reflection In one set of embodiments, a system 2000 may be configured as shown in FIG. 20. System 2000 includes the light modulation unit 110M as described above, and may also include a dual TIR prism 2010, a first light sensing device 130A and a second light sensing device 130B.

The light modulation unit 110M includes an array of mirrors, where each of the mirrors is configured to controllably switch between two orientation states, e.g., as variously described above.

The dual TIR prism 2010 has a front surface SF, a back surface SB, a first partially-internal surface K1, a second partially-internal surface K1, a first exiting surface E1 and a second exiting surface E2.

The dual TIR prism 2010 is configured to receive an incident light beam L at the front surface SF and output the incident light beam at the back surface SB. The dual TIR prism is further configured to receive a first modulated light beam $MLB_1$ at the back surface SB and from the array of mirrors, totally internally reflect the first modulated light beam at the first partially-internal surface K1, and output the first modulated light beam onto a first sensing path at the first exiting surface E1. The dual TIR prism is further configured to receive a second modulated light beam $MLB_2$ at the back surface SB and from the array of mirrors, totally internally reflect the second modulated light beam at the second partially-internal surface K2, and output the second modulated light beam onto a second sensing path at the second exiting surface E2. The first modulated light beam $MLB_1$ comprises pieces of the incident light beam L that are reflected by mirrors in a first of the two orientation states. The second modulated light beam $MLB_2$ comprises pieces of the incident light beam that are reflected by mirrors in a second of the two orientation states.

In some embodiments, the first modulated light beam $MLB_1$ and the second modulated light beam $MLB_2$ may have angles of incidence upon the back surface that are equal in magnitude but opposite in sign. In other embodiments—for example, embodiments where the DMD is tilted at an angle with respect to the imaging path axis, $MLB_1$ and $MLB_2$ may have angles of incidence that are different in magnitude.

For more information on dual TIR prisms, please see U.S. patent application Ser. No. 12/665,237 (Publication No. 2010/0189344 A1), PCT filed on Jun. 18, 2008, invented by Dirk L. A. Maes. See also "Dual TIR prism, a way to boost the performance of a DLP projector", SID MEC Spring Meeting 2008, 13 Mar. 2008, Dirk Maes, available at http://www.iof.fraunhofer.de/sid/_media/dirk_maes.pdf.

The first light sensing device 130A may be configured to receive at least a portion of the first modulated light beam $MLB_1$ from the first sensing path, and generate a first electrical signal representing intensity of the "at least a portion" of the first modulated light beam. The first light sensing device 130A may an instance of the light sensing device 130 described above, in any of its various embodiments.

The second light sensing 130B may be device configured to receive at least a portion of the second modulated light beam $MLB_2$ from the second sensing path, and generate a second electrical signal representing intensity of the "at least a portion" of the second modulated light beam. The first light sensing device 130B may an instance of the light sensing device 130 described above, in any of its various embodiments.

In some embodiments, the front surface SF is substantially perpendicular to a central axis of the incident light beam, or, to a central axis of the optical subsystem 105 as described above.

In some embodiments, the back surface SB is substantially parallel to a plane of the array of mirrors.

In some embodiments, the front and back surfaces are parallel, wherein the first and second partially-internal surfaces have mirror-image symmetry with respect to a plane orthogonal to the first and second surfaces.

In some embodiments, the dual TIR prism includes four prisms that are held together with small air gaps between adjacent prisms, e.g., air gaps as variously described above.

In some embodiments, system 2000 includes the optical subsystem 105 (e.g., a camera lens) as described above, e.g., as shown in FIG. 21.

The input optical subsystem 105 may be configured to receive the incident light beam L and to provide the incident light beam to the front surface of the dual TIR prism, e.g., as shown in FIG. 21.

The input optical subsystem may be configured so that an image carried by the incident light beam is in focus at the array of mirrors. In some embodiments, the input optical subsystem has an adjustable focus mechanism so that it can focus on objects at a range of distances from the system.

In one set of embodiments, a method 2200 may include the actions shown in FIG. 22. Method 22 may be performed using, e.g., the system 2000, in any of its various embodiments.

Action 2210 includes receiving an incident light beam at a front surface of a dual TIR prism.

Action 2215 includes outputting the incident light beam at a back surface of the dual TIR prism.

Action 2220 includes receiving a first modulated light beam and a second modulated light beam at the back surface of the dual TIR prism, where the first modulated light beam and the second modulated light beam have different angles of incidence upon the back surface, where the first modulated light beam and the second modulated light beam are produced by an array of mirrors, wherein each of the mirrors is configured to controllably switch between two orientation states.

Action 2225 includes totally internally reflecting the first modulated light beam at a first partially-internal surface of the dual TIR prism.

Action 2230 includes after said totally internally reflecting the first modulated light beam, outputting the first modulated light beam onto a first light sensing path.

Action 2235 includes totally internally reflecting the second modulated light beam at a second partially-internal surface of the dual TIR prism.

Action 2240 includes after totally internally reflecting the second modulated light beam, outputting the second modulated light beam onto a second light sensing path.

In some embodiments, the method 2200 may also include generating a first electrical signal representing intensity of the first modulated light beam (or at least a portion of the first modulated light beam), and generating a second electrical signal representing intensity of the second modulated light beam (or at least a portion of the second modulated light beam), e.g., as variously described above.

In some embodiments, the method 2200 may also include acquiring samples of the first electrical signal and acquiring samples of the second electrical signal, e.g., as variously described above.

In some embodiments, the method 2200 may also include constructing a first image based on the samples of the first electrical signal, and construction a second image based on the samples of the second electrical signal.

Figure 23:
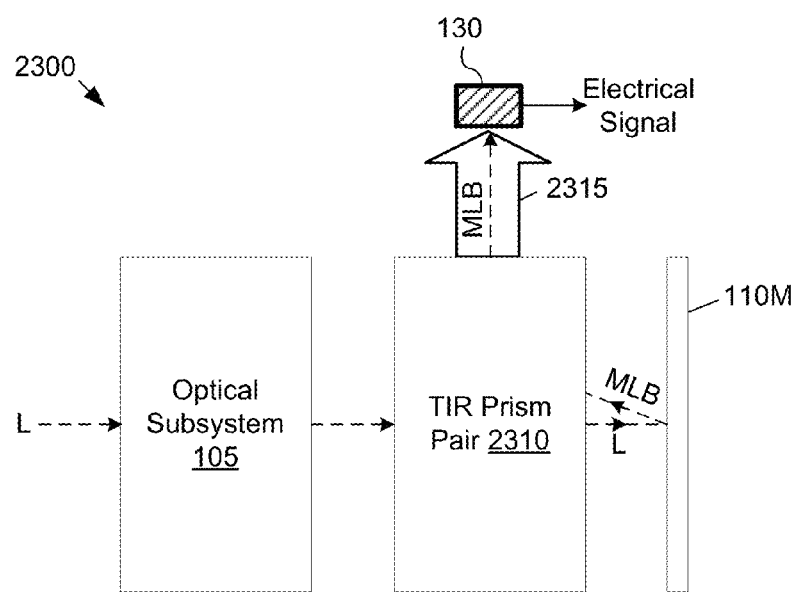
FIG. 23 illustrates one embodiment of a system 2300 for separating incident light and modulated light using a TIR prism pair 2210.

In one set of embodiments, a system 2300 may be configured as shown in FIG. 23. System 2300 may include the light modulation unit 110M and the light sensing device 130 as described above, and may also include TIR prism pair 2310. (Furthermore, system 2300 may include any subset of the features, embodiments and elements described above.)

The TIR prism pair 2310 is configured to receive an incident light beam L, to provide the incident light beam to the light modulation unit 110M, to receive a modulated light beam MLB from the light modulation unit 110M, and to direct the modulated light beam MLB onto a sensing path 2315.

The light modulation unit 100M is configured to generate the modulated light beam by modulating the incident light beam with a sequence of spatial patterns, e.g., as variously described above.

The light sensing device 130 receives the modulated light beam (or at least a portion of the modulated light beam) from the sensing path 2315 and generates an electrical signal that represents intensity of the modulated light beam (or said "at least a portion" of the modulated light beam). The TIR prism pair may separate the incident light beam from the modulated light beam, e.g., over a physical (or optical) distance that is significantly shorter than if the TIR prism were omitted.

The TIR prism pair 2310 may be a TIR prism, a reverse TIR prism or a double reverse TIR prism.

For an example of a double-reverse TIR prism, please see U.S. patent application Ser. No. 12/361,064, filed on Jan. 28, 2009, titled "Double-Reverse Total-Internal-Reflection-Prism Optical Engine".

In some embodiments, system 2300 may include the analog-to-digital converter 140 as described above. The ADC 140 is configured to acquire samples of the electrical signal. System 2300 may be configured so that a subset of the samples, corresponding to M of the spatial patterns, is usable to construct an n-pixel image or n-voxel video sequence representing at least a portion of the incident light beam. Furthermore, system 2300 may be configured so that the integer M is less than n, e.g., as variously described above.

In some embodiments, system 2300 may include the processing unit 150 described above. Processing unit 150 may be configured to construct the n-pixel image or the n-voxel video sequence based on the sample subset and the M spatial patterns.

Figure 24:
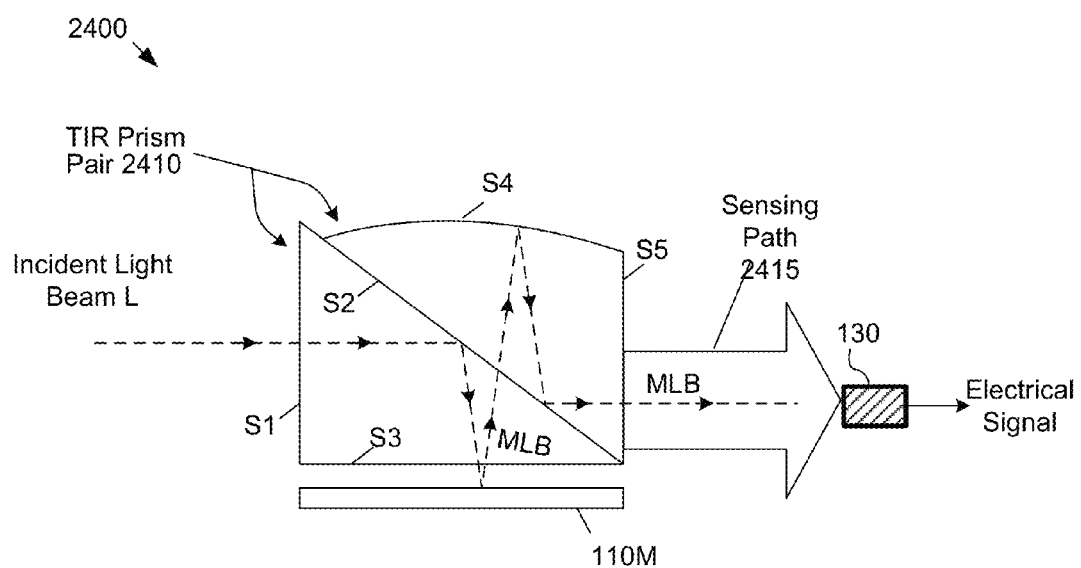
FIG. 24 illustrates one embodiment of a system 2400 for separating incident light and modulated light using a double-reverse TIR prism 2410.

In one set of embodiments, a system 2400 may be configured as shown in FIG. 24. System 2400 may include the light modulation unit 110M and the light sensing device 130 as described above, and may also include TIR prism pair 2410. (Furthermore, system 2400 may include any subset of the features, embodiments and elements described above.)

The TIR prism pair 2410 receives the incident light beam at the surface S1, totally internally reflects the incident light beam at an internal surface S2, and outputs the incident light beam (to the modulator 110M) at the surface S3. Furthermore, the TIR prism pair receives a modulated light beam MLB (from the modulator 110M) at the surface S3. The modulated light beam passes through internal surface S2, is totally internally reflected at surface S4, is totally internally reflected again at surface S2, and is outputted at surface S3, i.e., outputted onto a sensing path 2415.

The TIR prism pair 2410 may be a double-reverse TIR prism pair, e.g., as disclosed in U.S. application Ser. No. 12/361,064.

The light sensing device 130 receives the modulated light beam (or at least a portion of the modulated light beam) and generates an electrical signal that represents intensity of the modulated light beam (or said "at least a portion" of the modulated light beam).

Compressive Imaging System 2500

Figure 25:
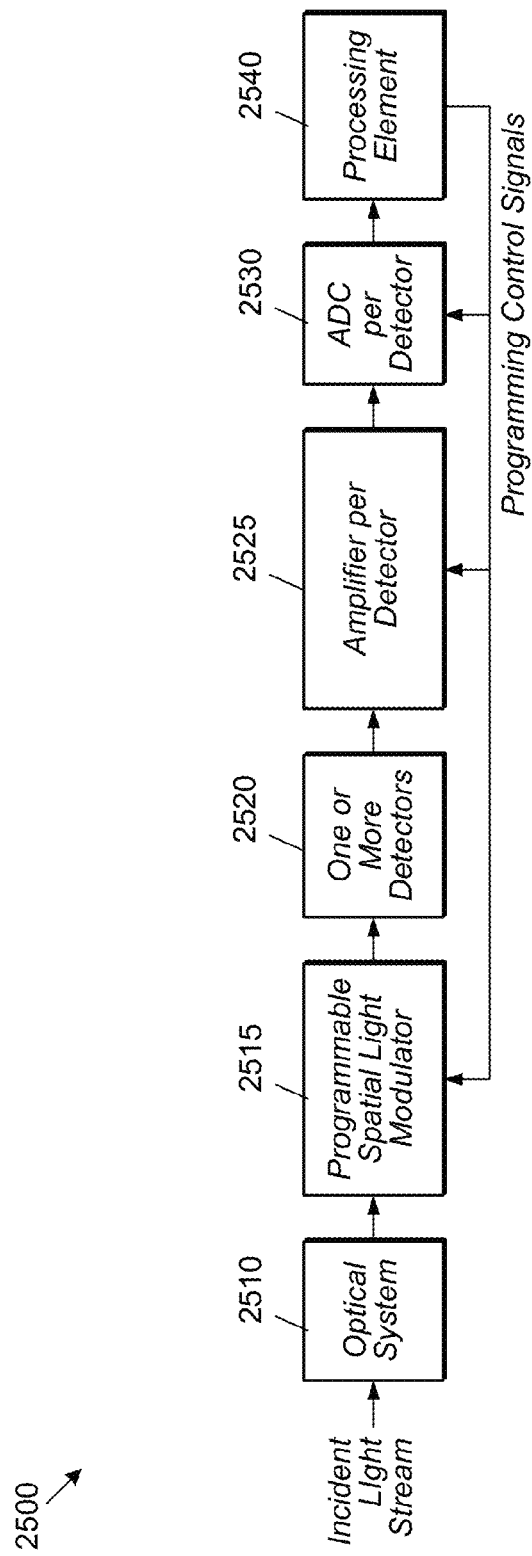
FIG. 25 illustrates one embodiment of a compressive imaging system 2500 having one or more post-modulation acquisition channels.

In one set of embodiments, a compressive imaging system 2500 may be configured as shown in FIG. 25. The compressive imaging (CI) system may include an optical system 2510, a spatial light modulator 2515, a set 2520 of one or more photodetectors, a set 2525 of one or more amplifiers (i.e., one amplifier per detector), a set 2530 of analog-to-digital converters (one ADC per detector), and a processing element 2540.

The optical system 2510 focuses an incident light stream onto the spatial light modulator, e.g., as variously described above. See the discussion above regarding optical subsystem 105. The incident light stream carries an image (or a spectral ensemble of images) that is to be captured by the CI system in compressed form.

The spatial light modulator 2515 modulates the incident light stream with a sequence of spatial patterns to obtain a modulated light stream, e.g., as variously described above.

Each of the detectors 2520 generates a corresponding electrical signal that represents the intensity of a corresponding portion of the modulated light stream, e.g., a spatial portion or a spectral portion of the modulated light stream.

Each of the amplifiers 2525 (e.g., transimpedance amplifiers) amplifies the corresponding detector signal to produce a corresponding amplified signal.

Each of the ADCs 2530 acquires samples of the corresponding amplified signal.

The processing element 2540 may operate on the sample sets obtained by the respective ADCs to construct respective images. The images may represent spatial portions or spectral slices of the incident light stream. Alternatively, or additionally, the processing element may send the sample sets to a remote system for image construction.

The processing element 2540 may include one or more microprocessors configured to execute program instructions stored in a memory medium.

The processing element 2540 may be configured to control one or more other elements of the CI system. For example, in one embodiment, the processing element may be configured to control the spatial light modulator, the transimpedance amplifiers and the ADCs.

The processing element 2540 may be configured to perform any subset of the above-described methods on any or all of the detector channels. Each of the detector channels of system 2500 may include any subset of the embodiments, features, and elements described above. (A detector channel may include a corresponding detector, amplifier and ADC.) For example, each detector channel may include any of the above-described mechanisms for dynamic range optimization and/or any of the above-described mechanisms for the identification and attenuation of hot spots in the incident light field.

Compressive Imaging System 2600

Figure 26:
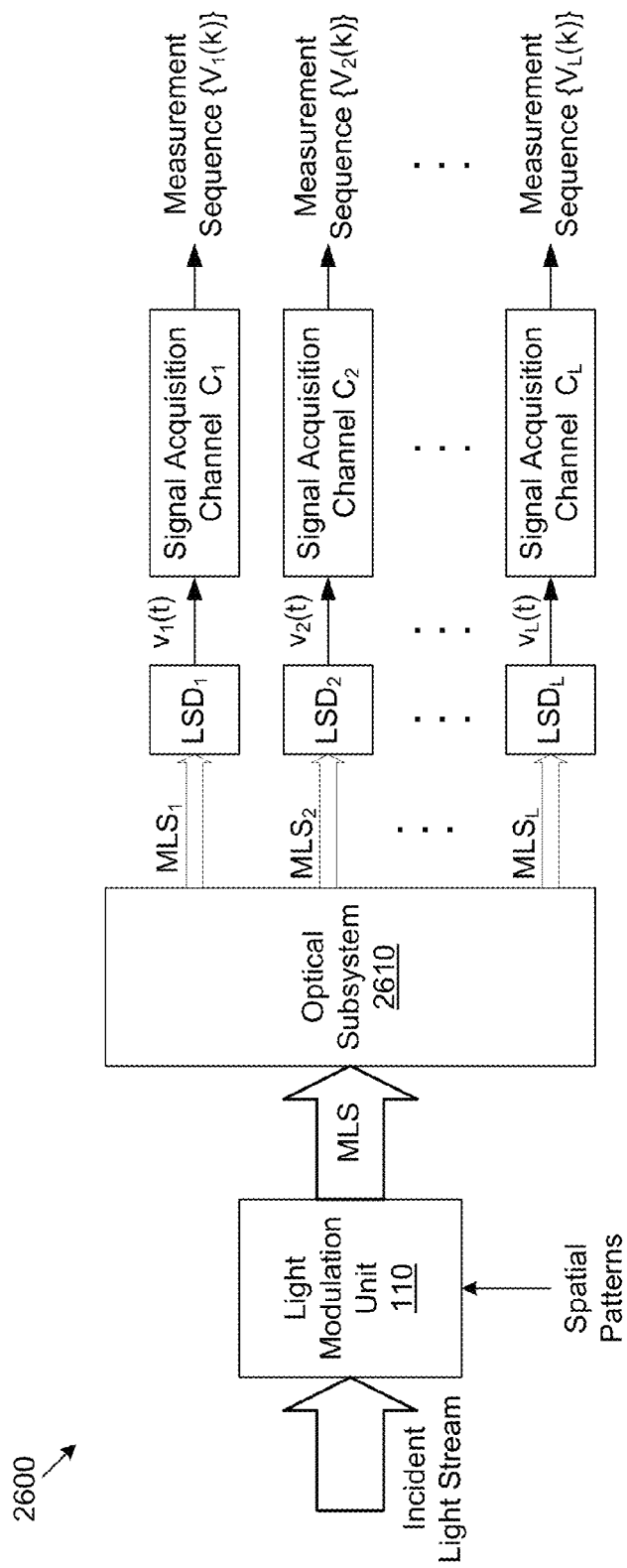
FIG. 26 illustrates one embodiment of a compressive imaging system 2600 having one or more post-modulation signal acquisition channels, and highlights the role of optical subsystem 2610 in delivering portions of the modulated light stream (MLS) to respective light sensing devices ($LSD_1$-$LSD_L$).

In one set of embodiments, a compressive imaging system 2600 may be configured as shown in FIG. 26. The compressive imaging system includes the light modulation unit 110 as variously described above, and also includes optical subsystem 2610, a set of L light sensing devices $LSD_1$ through $LSD_L$, and a set of L signal acquisition channels $C_1$ through $C_L$, where L in a positive integer.

The light modulation unit 110 receives an incident light stream and modulates the incident light stream with a sequence of spatial patterns to obtain a modulated light stream MLS, e.g., as variously described above.

The optical subsystem 2610 delivers portions (e.g., spatial portions or spectral portions) of the modulated light stream to corresponding ones of the light sensing devices $LSD_1$ through $LDS_L$. Please see U.S. patent application Ser. No. 13/197,304 for various mechanisms for delivering spatial subsets of the modulated light stream to respective light sensing devices.

In some embodiments, the optical subsystem 2610 includes one or more lenses and/or one or more mirrors arranged so as to deliver spatial portions of the modulated light stream onto respective ones of the light sensing devices. For example, in one embodiment, the optical subsystem 2610 includes a lens whose object plane is the plane of the array of light modulating elements and whose image plane is a plane in which the light sensing devices are arranged. The light sensing devices may be arranged in an array.

In some embodiments, optical subsystem 2610 is configured to separate the modulated light stream into spectral components and deliver the spectral components onto respective ones of the light sensing devices. For example, optical subsystem 2610 may include a grating, a spectrometer, or a tunable filter such as a Fabry-Perot Interferometer to achieve the spectral separation.

Each light sensing device $LSD_j$ generates a corresponding electrical signal $v_j(t)$ that represents intensity of the corresponding portion $MLS_j$ of the modulated light stream.

Each signal acquisition channel $C_j$ acquires a corresponding sequence of samples $\{V_j(k)\}$ of the corresponding electrical signal $v_j(t)$. Each signal acquisition channel may include a corresponding amplifier (e.g., a TIA) and a corresponding A/D converter.

The sample sequence $\{V_j(k)\}$ obtained by each signal acquisition channel may be used to construct a corresponding sub-image which represents a spatial portion or a spectral slice of the incident light stream. The number of samples m in each sample sequence $\{V_j(k)\}$ may be less (typically much less than) the number of pixels in the corresponding sub-image. Thus, each signal acquisition channel $C_j$ may operate as a compressive sensing camera for a spatial portion or spectral portion of the incident light.

Each of the signal acquisition channels may include any subset of the embodiments, features, and elements described above.

System 2600 may also include the optical subsystem 2010 (or the optical subsystem 105) for focusing the incident light stream onto the light modulation unit 110.

Any of the various embodiments described herein may be combined to form composite embodiments. Furthermore, any of the various embodiments described in U.S. Provisional Application No. 61/372,826 and in U.S. patent application Ser. Nos. 13/193,553, 13/193,556 and 13/197,304 may be combined with any of the various embodiments described herein to form composite embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a light modulation unit that includes an array of mirrors;
a TIR prism pair configured to receive an incident light beam, to provide the incident light beam to the light modulation unit, to receive a modulated light beam from the light modulation unit, and to direct the modulated light beam onto a sensing path;
a light sensing device configured to receive at least a portion of the modulated light beam from the sensing path, wherein the light sensing device is configured to generate an electrical signal representing intensity of said at least a portion of the modulated light beam as a function of time;
an analog-to-digital converter configured to acquire samples of the electrical signal, wherein the light modulation unit is configured to generate the modulated light beam by modulating the incident light beam with a sequence of spatial patterns, wherein a subset of the samples, corresponding to M of the spatial patterns, is usable to construct an n-pixel image or n-voxel video sequence representing at least a portion of the incident light beam, where M is less than n.

2. The system of claim 1, further comprising a processing unit configured to construct the n-pixel image or the n-voxel video sequence based on the sample subset and the M spatial patterns.

3. A system comprising:
a light modulation unit that includes an array of mirrors, wherein each of the mirrors is configured to controllably switch between two orientation states;
a TIR prism pair configured to receive an incident light beam and output the incident light beam to the array of mirrors, wherein the TIR prism pair is further configured to receive a modulated light beam from the array of mirrors, totally internally reflect the modulated light beam, and output the modulated light beam onto a sensing path, wherein the array of mirrors is configured to produce the modulated light beam by modulating the incident light beam as received from the TIR prism pair;
a light sensing device configured to receive at least a portion of the modulated light beam from the sensing path, wherein the light sensing device is configured to generate an electrical signal representing intensity of said at least a portion of the modulated light beam as a function of time;
an analog-to-digital converter (ADC) configured to acquire samples of the electrical signal, wherein said modulating the incident light beam comprises modulating the incident light beam with a sequence of spatial patterns, wherein the spatial patterns are configured so that a set of the samples, corresponding to M of the spatial patterns, is usable to construct an n-pixel image or n-voxel video sequence that represents at least a portion of the incident light stream, where M is less than n.

4. The system of claim 3, wherein the modulated light beam at any given time includes pieces of the incident light beam that are reflected by mirrors in a first of the two orientation states at that time, and does not include pieces of the incident light beam that are reflected by mirrors in a second of the two orientation states at that time.

5. The system of claim 4, wherein the TIR prism pair is configured to receive a complementary modulated light beam from the array of mirrors and to output the complementary modulated light beam onto an alternative path different from the sensing path, wherein the alternative path terminates onto a light absorbing device, wherein the complementary modulated light beam at any given time includes the pieces of the incident light beam that are reflected by the mirrors in the second orientation state at that time, and does not include the pieces of the incident light beam that are reflected by the mirrors in the first orientation state at that time.

6. The system of claim 3, wherein the TIR prism pair includes:
a first prism having a receiving surface and an exiting surface;
a second prism having a first surface, a second surface and a third surface;
wherein the TIR prism pair is configured so that the incident light beam enters the first prism through the receiving surface, exits the first prism through the exiting surface, enters the second prism through the first surface, and exits the second prism through the second surface, wherein the TIR prism pair is further configured so that the modulated light beam from the array of mirrors enters the second prism through the second surface, experiences total internal reflection at the first surface, and then exits at the third surface.

7. The system of claim 6, wherein the receiving surface is substantially perpendicular to a central axis of the incident light beam.

8. The system of claim 6, wherein the exiting surface of the first prism is substantially parallel to the first surface of the second prism.

9. The system of claim 6, wherein the second surface of the second prism is substantially parallel to a plane of the array of mirrors.

10. The system of claim 6, further comprising an input optical subsystem configured to receive the incident light beam and to provide the incident light beam to the receiving surface of the first prism.

11. The system of claim 10, wherein the input optical subsystem is configured so that the incident light beam is in focus at the array of mirrors.

12. A system comprising:
a light modulation unit that includes an array of mirrors, wherein each of the mirrors is configured to controllably switch between two orientation states;
a TIR prism pair configured to receive an incident light beam and to totally internally reflect the incident light beam prior to outputting the incident light beam to the array of mirrors, wherein the TIR prism pair is further configured to receive a modulated light beam from the array of mirrors and output the modulated light beam onto a sensing path, wherein the array of mirrors is configured to produce the modulated light beam by modulating the incident light beam as received from the TIR prism pair;
a light sensing device configured to receive at least a portion of the modulated light beam from the sensing path, wherein the light sensing device is configured to generate an electrical signal representing intensity of said at least a portion of the modulated light beam as a function of time;
an analog-to-digital converter (ADC) configured to acquire samples of the electrical signal, wherein said modulating the incident light beam comprises modulating the incident light beam with a sequence of spatial patterns, wherein the spatial patterns are configured so that a set of the samples, corresponding to M of the spatial patterns, is usable to construct an n-pixel image or n-voxel video sequence representing at least a portion of the incident light beam, where M is less than n.

13. The system of claim 12, wherein the modulated light beam at any given time includes pieces of the incident light beam that are reflected by mirrors in a first of the two orientation states at that time, and does not include pieces of the incident light beam that are reflected by mirrors in a second of the two orientation states at that time.

14. The system of claim 12, wherein the TIR prism pair includes a first prism and a second prism, wherein the first prism includes first, second and third surfaces, wherein the second prism includes a receiving surface and an exiting surface, wherein the TIR prism pair is configured so that the incident light beam enters the first prism through the first surface, experiences total internal reflection at the second surface, and exits the first prism at the third surface, wherein the TIR prism pair is further configured so that the modulated light beam enters the first prism at the third surface, exits the first prism at the second surface, enters the second prism at the receiving surface and exits the second prism at the exiting surface.

15. The system of claim 14, wherein the first surface is substantially perpendicular to a central axis of the incident light beam.

16. The system claim 14, wherein the third surface is substantially parallel to the array of mirrors.

17. The system of claim 14, further comprising an input optical subsystem configured to receive the incident light beam and optically modify the incident light beam so the incident light beam is in focus at a plane of the array of mirrors.

18. A system comprising:
a light modulation unit that includes an array of mirrors, wherein each of the mirrors is configured to controllably switch between two orientation states;
a dual TIR prism having a front surface, a back surface, a first partially-internal surface, a second partially-internal surface, a first exiting surface and a second exiting surface, wherein the dual TIR prism is configured to receive an incident light beam at the front surface and output the incident light beam at the back surface, wherein the dual TIR prism is further configured to receive a first modulated light beam from the array of mirrors at the back surface, totally internally reflect the first modulated light beam at the first partially-internal surface, and output the first modulated light beam onto a first sensing path at the first exiting surface, wherein the dual TIR prism is further configured to receive a second modulated light beam from the array of mirrors at the back surface, totally internally reflect the second modulated light beam at the second partially-internal surface, and output the second modulated light beam onto a second sensing path at the second exiting surface, wherein the first modulated light beam comprises pieces of the incident light beam that are reflected by mirrors in a first of the two orientation states, wherein the second modulated light beam comprises pieces of the incident light beam that are reflected by mirrors in a second of the two orientation states;
a first light sensing device configured to receive at least a portion of the first modulated light beam from the first sensing path, and generate a first electrical signal representing intensity of said at least a portion of the first modulated light beam; and
a second light sensing device configured to receive at least a portion of the second modulated light beam from the second sensing path, and generate a second electrical signal representing intensity of said at least a portion of the second modulated light beam.

19. The system of claim 18, wherein the front surface is substantially perpendicular to an axis of the incident light beam.

20. The system of claim 18, wherein the back surface is substantially parallel to a plane of the array of mirrors.

21. The system of claim 18, wherein the front and back surfaces are parallel, wherein the first and second partially-internal surfaces have mirror-image symmetry with respect to a plane orthogonal to the first and second surfaces.

22. A method comprising:
(a) receiving an incident light beam at a front surface of a dual TIR prism;
(b) outputting the incident light beam at a back surface of the dual TIR prism;
(c) receiving a first modulated light beam and a second modulated light beam at the back surface of the dual TIR prism, wherein the first modulated light beam and the second modulated light beam have different angles of incidence upon the back surface, where the first modulated light beam and the second modulated light beam are produced by an array of mirrors, wherein each of the mirrors is configured to controllably switch between two orientation states;
(d) totally internally reflecting the first modulated light beam at a first partially-internal surface of the dual TIR prism;
(e) after said totally internally reflecting the first modulated light beam, outputting the first modulated light beam onto a first light sensing path;
(f) totally internally reflecting the second modulated light beam at a second partially-internal surface of the dual TIR prism;
(g) after totally internally reflecting the second modulated light beam, outputting the second modulated light beam onto a second light sensing path.

* * * * *